(12) United States Patent
Stoner et al.

(10) Patent No.: US 8,262,783 B2
(45) Date of Patent: Sep. 11, 2012

(54) GAS SEPARATION DEVICE

(75) Inventors: Christopher Stoner, Vancouver (CA); Christopher R. McLean, Vancouver (CA); Daryl Musselman, North Vancouver (CA)

(73) Assignee: Air Products and Chemicals, Inc., Allentown, PA (US)

( * ) Notice: Subject to any disclaimer, the term of this patent is extended or adjusted under 35 U.S.C. 154(b) by 319 days.

(21) Appl. No.: 12/524,152

(22) PCT Filed: Jan. 23, 2008

(86) PCT No.: PCT/CA2008/000148
§ 371 (c)(1),
(2), (4) Date: Dec. 3, 2009

(87) PCT Pub. No.: WO2008/089564
PCT Pub. Date: Jul. 31, 2008

(65) Prior Publication Data
US 2010/0089241 A1    Apr. 15, 2010

Related U.S. Application Data

(60) Provisional application No. 60/886,486, filed on Jan. 24, 2007.

(51) Int. Cl.
*B01D 53/02* (2006.01)
(52) U.S. Cl. .......... 96/108; 96/125; 96/143; 137/625.46
(58) Field of Classification Search .............. 96/108, 96/125, 130, 143, 154; 137/624.46
See application file for complete search history.

(56) References Cited

U.S. PATENT DOCUMENTS

| | | | |
|---|---|---|---|
| 6,135,458 A | 10/2000 | Fuse | |
| 6,311,719 B1 | 11/2001 | Hill et al. | |
| 6,514,319 B2 | 2/2003 | Keefer et al. | |
| 6,533,846 B1 * | 3/2003 | Keefer et al. | 96/125 |
| 6,889,710 B2 | 5/2005 | Wagner | |
| 7,037,358 B2 | 5/2006 | Babicki et al. | |
| 7,094,275 B2 | 8/2006 | Keefer et al. | |

OTHER PUBLICATIONS

International Search Report and the Written Opinion of the International Searching Authority, mailed May 8, 2008, for corresponding International Application No. PCT/CA2008/000148.

* cited by examiner

*Primary Examiner* — Robert A Hopkins
(74) *Attorney, Agent, or Firm* — Eric J. Schaal

(57) ABSTRACT

A gas separation device is disclosed. In particular, seal assemblies and adsorbent element constructions for a gas separation device such as a pressure swing adsorption device are disclosed. The seal assembly can be part of a rotary valve and can include a seal backer and a floating seal positioned within a bore in the seal backer. The floating seal is configured to press towards and seal against an adjacent rotor. Valve action is provided as apertures in the floating seal and rotor are brought into and then out of alignment as a result of relative rotation therebetween. The seal assembly can include two types of gas chambers to apply balanced sealing pressures over the sealing surface of the valve, one type configured to receive pressurized process gas from within the device and the other configured to receive gas from an independently controlled pressurized gas source. The adsorber elements in the device may comprise improved spacer cross support structures at the ends of wound laminate adsorbent structures.

21 Claims, 20 Drawing Sheets

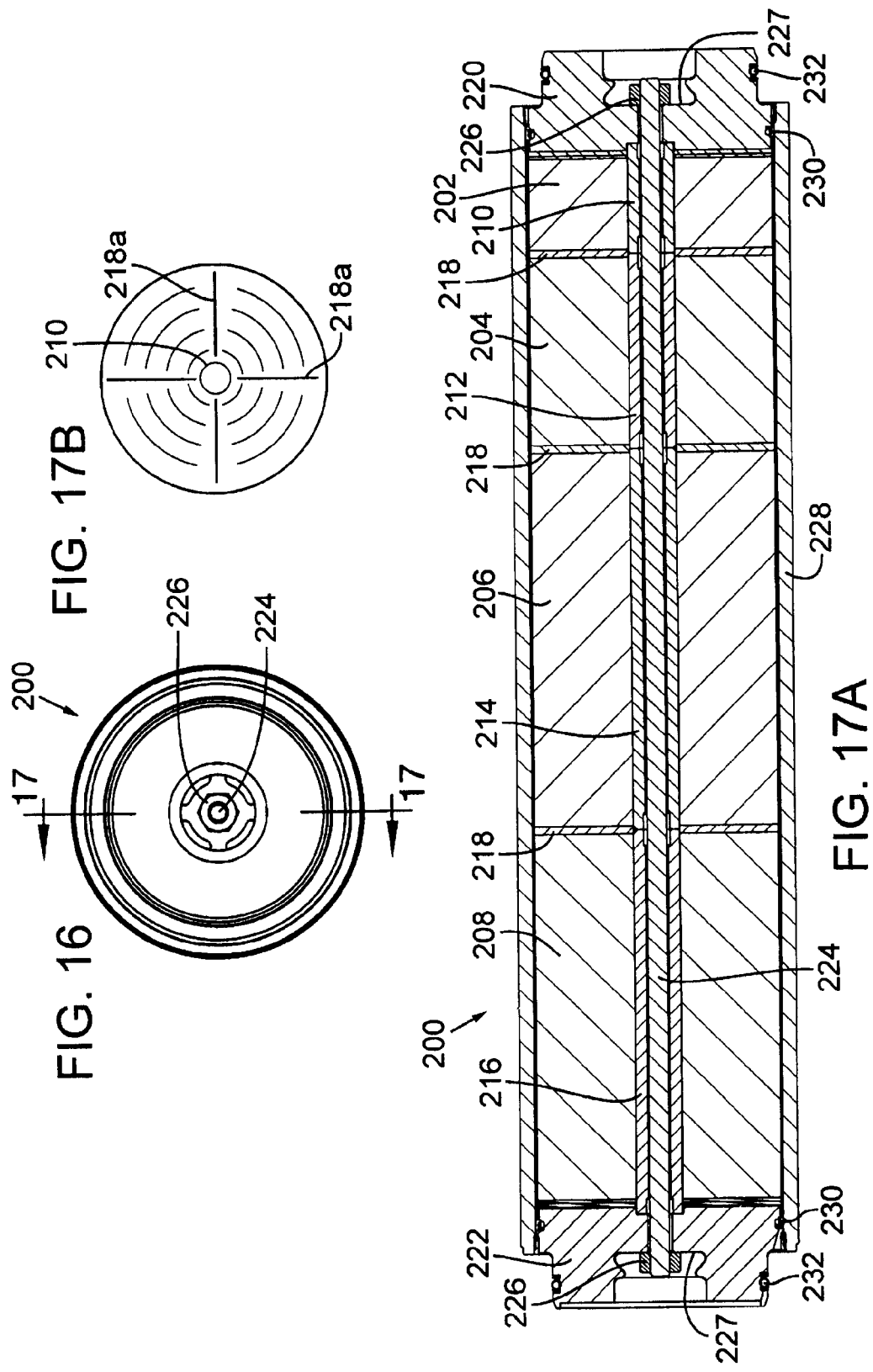

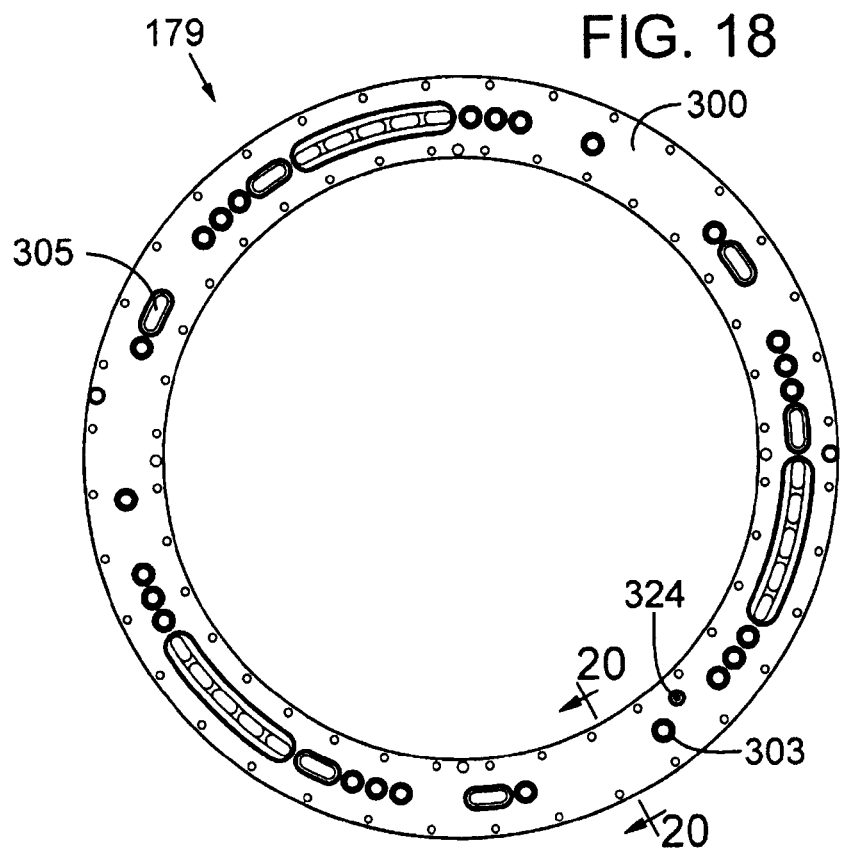
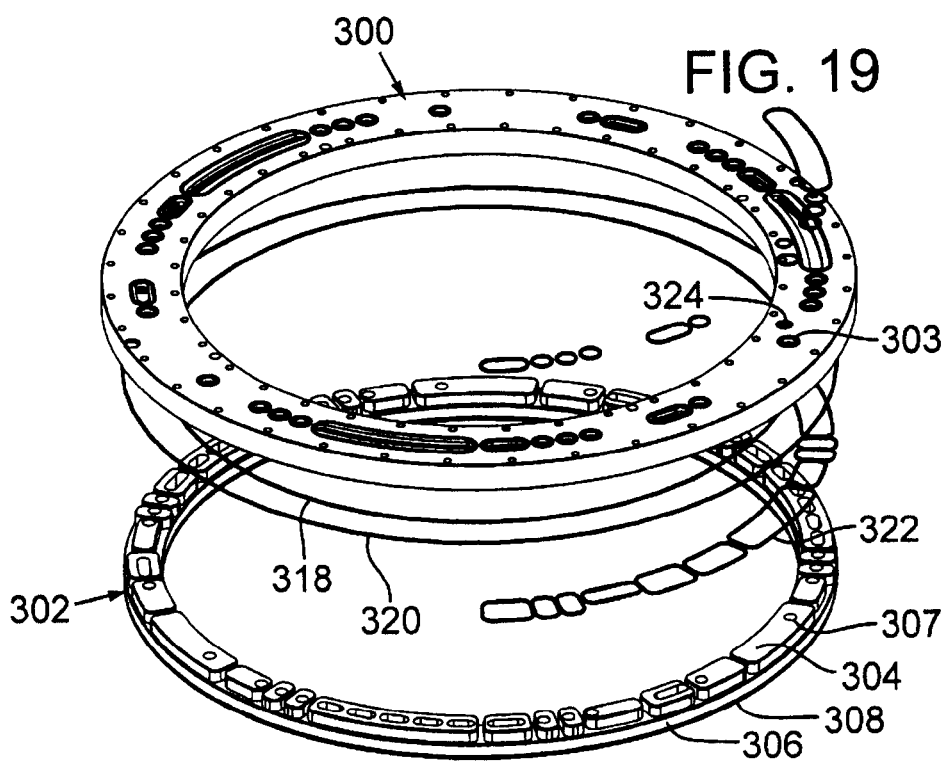

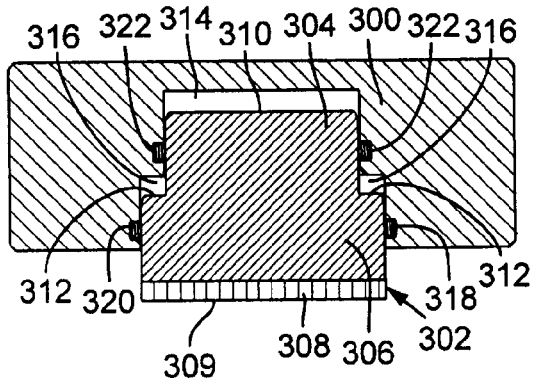
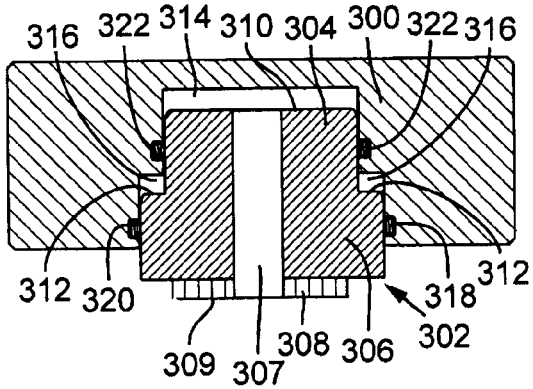
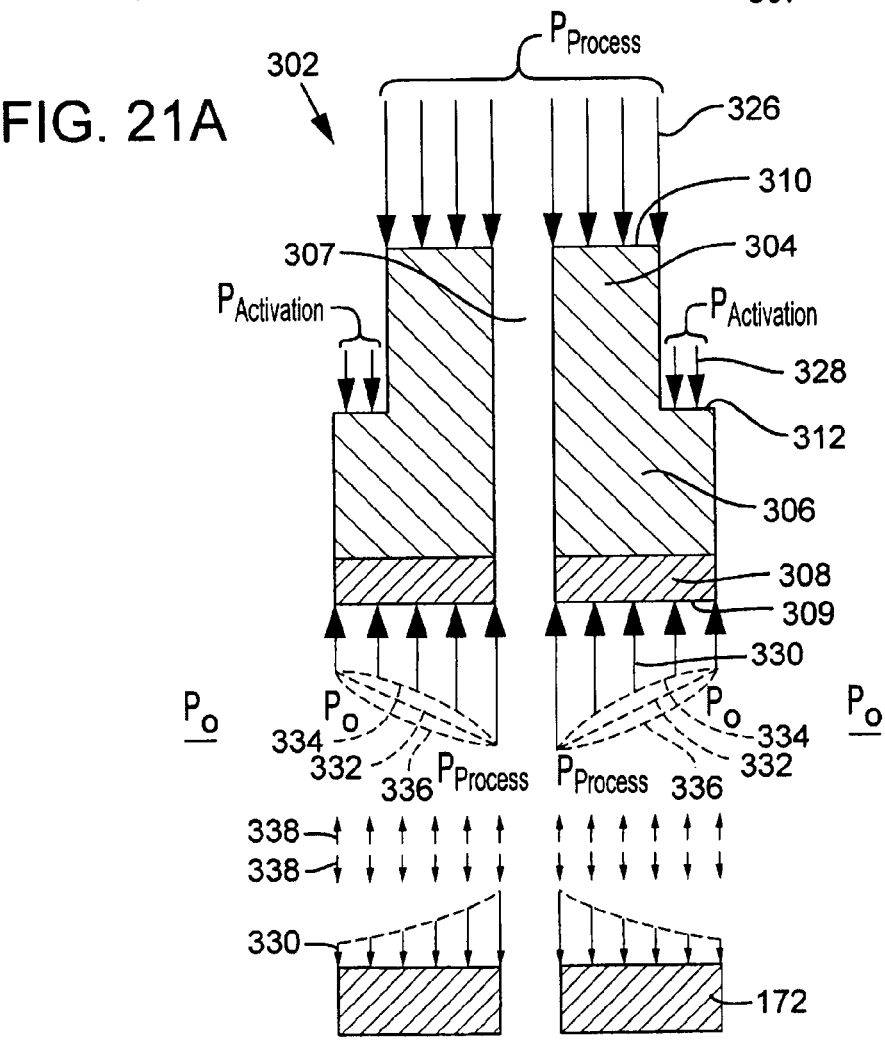

GAS SEPARATION DEVICE

CROSS REFERENCE TO RELATED APPLICATIONS

This is the U.S. National Stage of International Application No. PCT/CA2008/000148, filed Jan. 23, 2008, which in turn claims the benefit of U.S. Provisional Application No. 60/886,486, filed Jan. 24, 2007. Both applications are incorporated herein in their entirety.

FIELD

This disclosure concerns gas separation devices, such as rotary pressure swing adsorption devices that can be used to separate hydrogen from a feed gas. In particular, it concerns seal assemblies and adsorbent element constructions for such devices.

BACKGROUND

Gas separation can be accomplished by passing a mixture of gases over an adsorbent material that preferentially adsorbs a more readily adsorbed component relative to a less readily adsorbed component of the mixture. Examples of such processes include temperature swing adsorption (TSA) and pressure swing adsorption (PSA). PSA generally involves coordinated pressure cycling of a gaseous mixture over an adsorbent material. The total pressure is elevated during intervals of flow in a first direction through the adsorbent bed and is reduced during intervals of flow in the reverse direction. As the cycle is repeated, the less readily adsorbed component is concentrated in the first direction, while the more readily adsorbed component is concentrated in the reverse direction.

Some examples of known PSA devices are disclosed in U.S. Pat. Nos. 7,037,358 and 7,094,275, which are incorporated herein by reference. These references, for example, disclose PSA devices capable of purifying hydrogen for use in fuel cells. This continues to be an important application of PSA technology. Other applications include, for example, the separation of carbon dioxide from methane and the purification of oxygen.

Pressure swing reactors (e.g., pressure swing reformers) also are known. Like PSA devices, pressure swing reactors generally are configured to cycle the pressure of a gaseous mixture. This pressure cycling can improve reaction yields, particularly of equilibrium-limited reactions.

SUMMARY

Disclosed herein are embodiments of a rotary gas separation device, such as a rotary pressure swing adsorption device. The rotary pressure swing device can include, for example, a rotor with a plurality of adsorber elements, a stator with a plurality of conduits, and a rotary valve comprising a seal assembly positioned between the rotor and the stator.

A first disclosed embodiment of a seal assembly comprises a seal backer which receives a mating portion of a floating seal that is movable with respect to the seal backer. The seal backer comprises a plurality of apertures aligned with flow ports through the floating seal. The floating seal comprises a sealing face opposite the seal backer to provide sealing engagement to an adjacent surface rotating with respect to the seal assembly. The seal backer and the mated floating seal define plural, fluidly isolated process gas and activation gas chambers for receiving process and activation gases respectively. The process and activation gases apply sealing pressure to the floating seal thereby moving it towards the adjacent surface. The process gas chambers are fluidly connected to flow ports through the floating seal, and the activation gas chambers are fluidly connectable to a source of activation gas.

More particularly, the seal backer can comprise at least one stepped bore for receiving a mating, stepped portion of the floating seal. The surfaces of the stepped bore and the stepped portion of the floating seal can define the process gas chambers and activation gas chambers.

Gas pressure in the activation gas chambers can be provided via fluid connection to an external supply of activation gas and the pressure in each chamber may be independently controllable. In a simple embodiment, the activation gas chambers can all be fluidly interconnected. The activation gas from the external supply can be provided to the activation gas chambers through a pressurization port opening in the seal backer. The pressurization port, or ports, may be effectively coupled to a control valve and a pressure gauge for monitoring and adjusting gas pressure in at least one activation gas chamber.

In many embodiments the floating seal is circular. For such embodiments, the stepped portion may be divided into projections spaced about its circumference with spaces between the projections. Furthermore, at least one of the projections includes seals positioned between the seal backer and the floating seal to fluidly isolate the process gas and activation gas chambers. The projections may have the same dimensions and shapes, but most typically at least some of the projections have different dimensions and/or shapes.

The seal assembly typically includes plural bores as part of the stepped bore in the seal backer for receiving plural mating projections in the stepped portion of the floating seal. This allows variable sealing pressures to be applied about the seal assembly by two or more of the plural mating portions so as to substantially fluidly seal the floating seal to an adjacent rotating surface.

Each projection in the sealing assembly typically has a process gas chamber surface and an activation gas chamber surface opposite the sealing face of the floating seal. The sum of the process gas and activation gas chamber surface areas in a projection may be equal to the area of the opposing sealing surface. In other embodiments, the sum does not equal the area of the opposing seal surface and thus may be greater than or less than that of the opposing seal surface. Further, the ratio of the process gas chamber surface area to the activation gas chamber surface area may be constant about the assembly. Alternatively however, the ratio may vary between two or more projections to provide different sealing pressures about the assembly.

Embodiments of a method for providing a seal in a rotary valve in a rotary gas separation device (e.g. a pressure swing adsorption device) also are described. The method comprises providing a rotary gas separation device comprising a stator, a rotor, and a rotary valve comprising the aforementioned seal assembly, cyclically flowing pressurized process gas into the process gas chambers, and flowing activation gas into the activation gas chambers at a pressure suitable to establish a pressure balanced seal between the seal assembly and the rotor.

For those embodiments mentioned above which comprise projections in the floating seal, the method can comprise providing a rotary gas separation device comprising a stator, a rotor, and a rotary valve comprising the seal assembly, selecting a process gas chamber surface area and an activation gas surface area for each projection in accordance with the process gas pressures employed in the gas separation device, cyclically flowing pressurized process gas into the process gas chambers, and flowing activation gas into the activation gas chambers at a pressure suitable to establish a pressure balanced seal between the seal assembly and the rotor. It may be desirable to select the surface areas such that a local net closing pressure is established across the width of the sealing face that is about 10% of the local process gas pressure. And, again, the activation gas in these embodiments may be provided from an external source and the activation gas chambers may receive activation gas at the same pressure.

The method can be used to process feed streams of variable composition to produce a desired product gas. For a working embodiment, one such desired product gas comprises hydrogen.

Also disclosed herein are adsorber elements for a pressure swing adsorption device that comprise an improved spacer support in their construction. Such adsorber elements comprise a laminate adsorbent structure comprising layers of laminate with a separation between the layers. The laminate itself comprises an adsorbent material and a support. And, the adsorber element additionally comprises an improved spacer support at an end of the laminate adsorbent structure in which the support has penetrated between the laminate layers at the end of the laminate adsorbent structure.

The laminate adsorbent structure typically comprises a spiral winding of the laminate and an improved spacer support may be used at both ends thereof. The improved spacer support may have a cross shape and can be made of epoxy.

The aforementioned adsorber elements can be made by providing the laminate adsorbent structure, applying a liquid resin to the end of the laminate structure (e.g. epoxy resin), allowing the liquid resin to penetrate into the ends of the laminate structure, and by curing the resin.

BRIEF DESCRIPTION OF THE DRAWINGS

FIG. 16 is a plan view of the top end of one embodiment of an adsorber element suitable for use with embodiments of the disclosed rotary pressure swing device.

FIG. 17A is a cross sectional view of the adsorber element embodiment shown in FIG. 16 taken along the line 17-17.

FIG. 17B is a plan view of a spacer cross support structure between laminate structures in the adsorber element embodiment of FIG. 17A.

FIG. 18 is a plan view of an exemplary upper seal assembly for use between the upper stator plate and the upper rotor end plate in some embodiments of the disclosed rotary pressure swing device.

FIG. 19 is an exploded perspective view of the upper valve assembly shown in FIG. 18.

FIGS. 20A-20B are cross sectional views of upper valve assemblies, such as shown in FIG. 18, taken along the line 20-20.

FIG. 21A is a schematic cross sectional view showing the pressures acting on the lower portion of the upper valve assembly shown in FIG. 18 during operation of the rotary pressure swing device.

DETAILED DESCRIPTION

Figure 1:
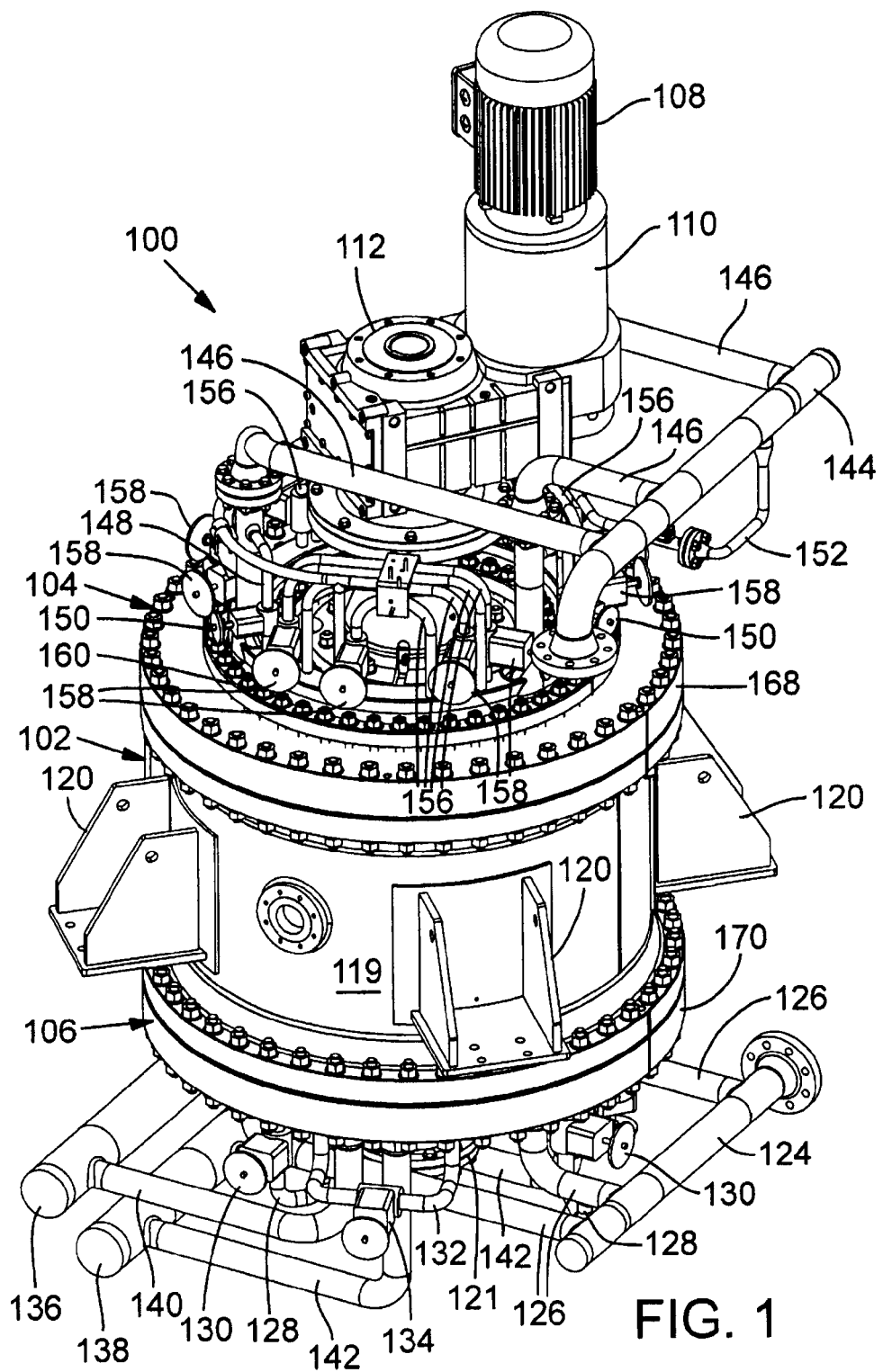
FIG. 1 is a first perspective view of one pressure swing embodiment of the disclosed rotary gas separation device.
Figure 2:
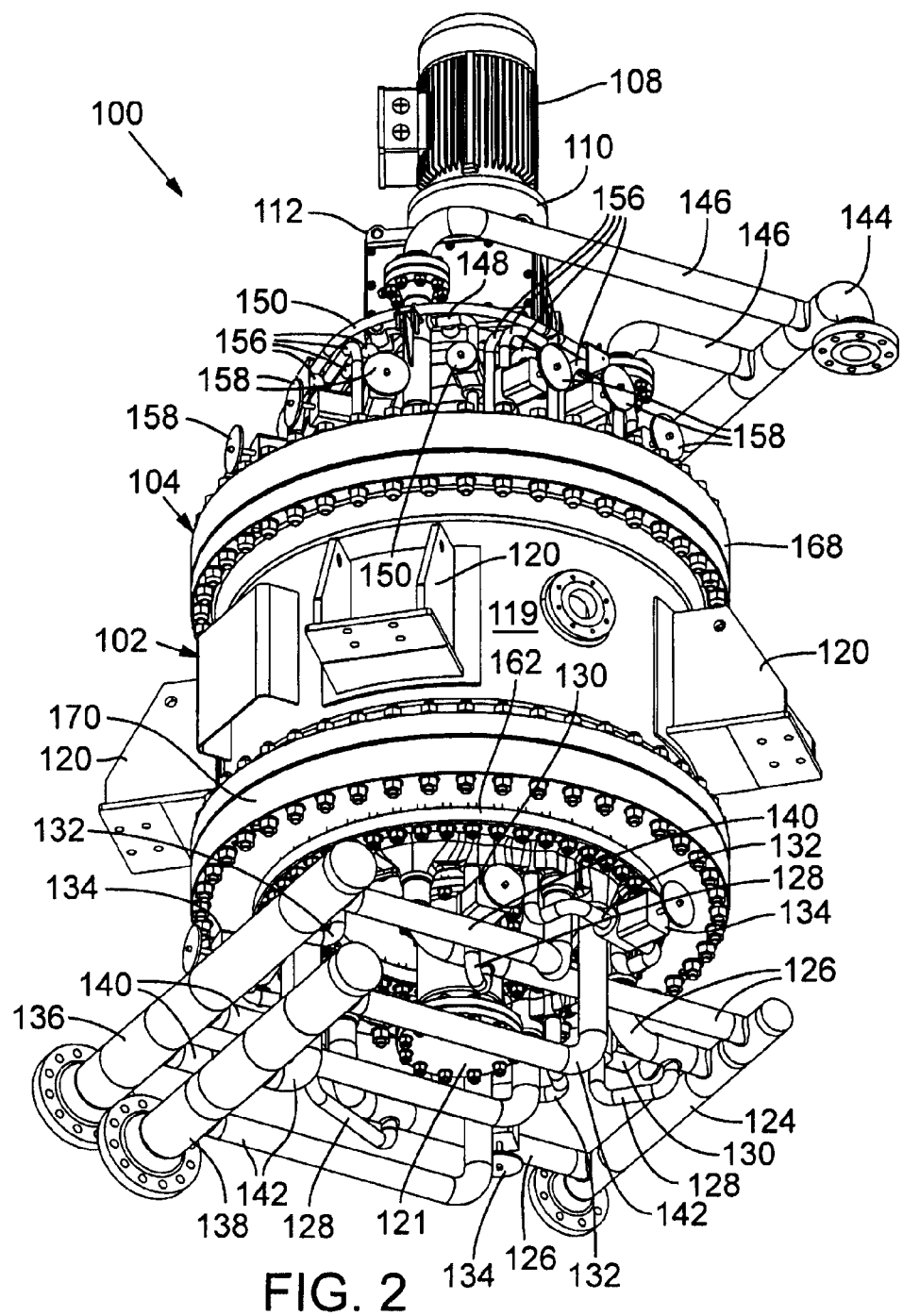
FIG. 2 is second perspective view of the rotary pressure swing device embodiment shown in FIG. 1.
Figure 3:
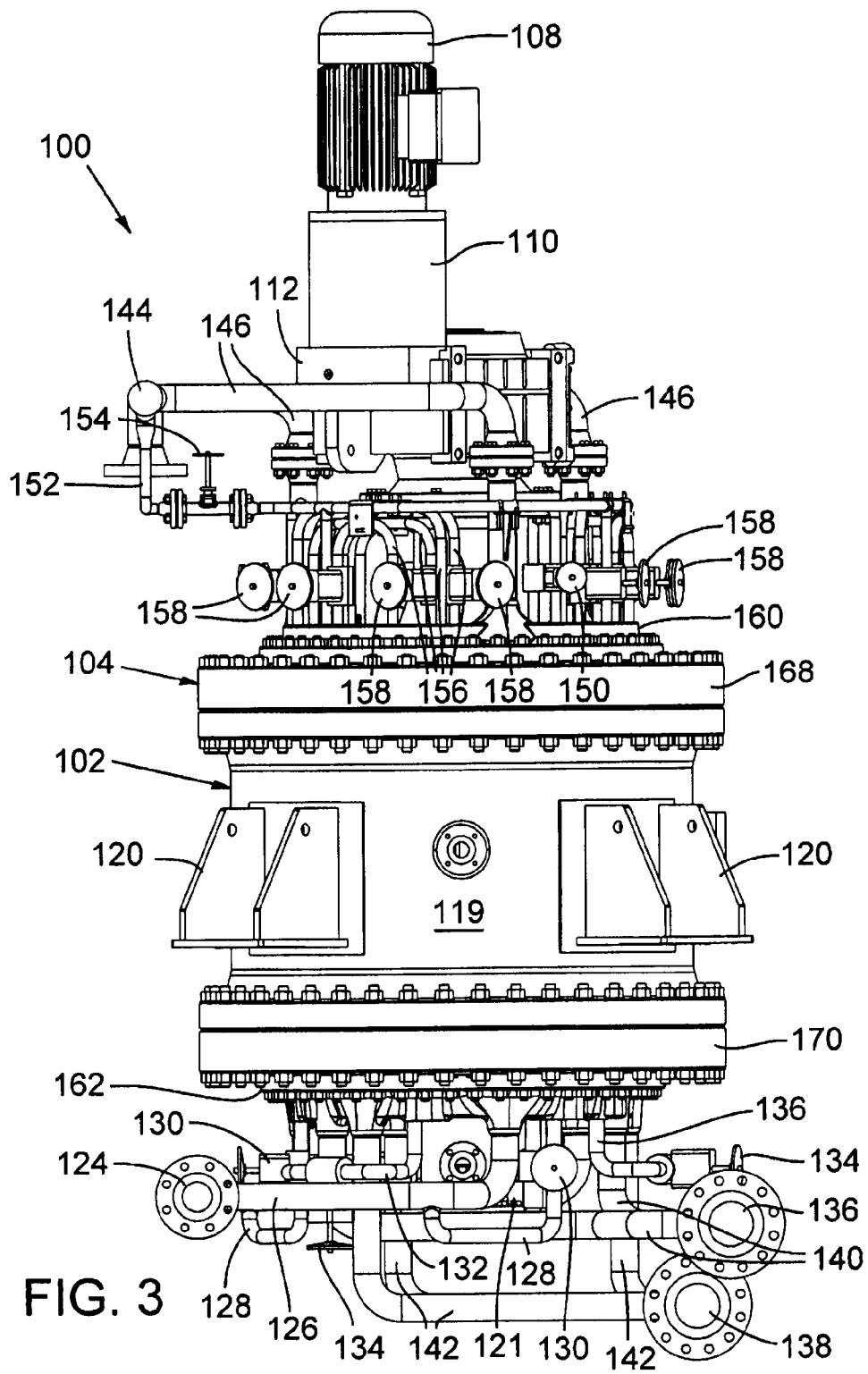
FIG. 3 is a first profile view of the rotary pressure swing device embodiment shown in FIG. 1.
Figure 4:
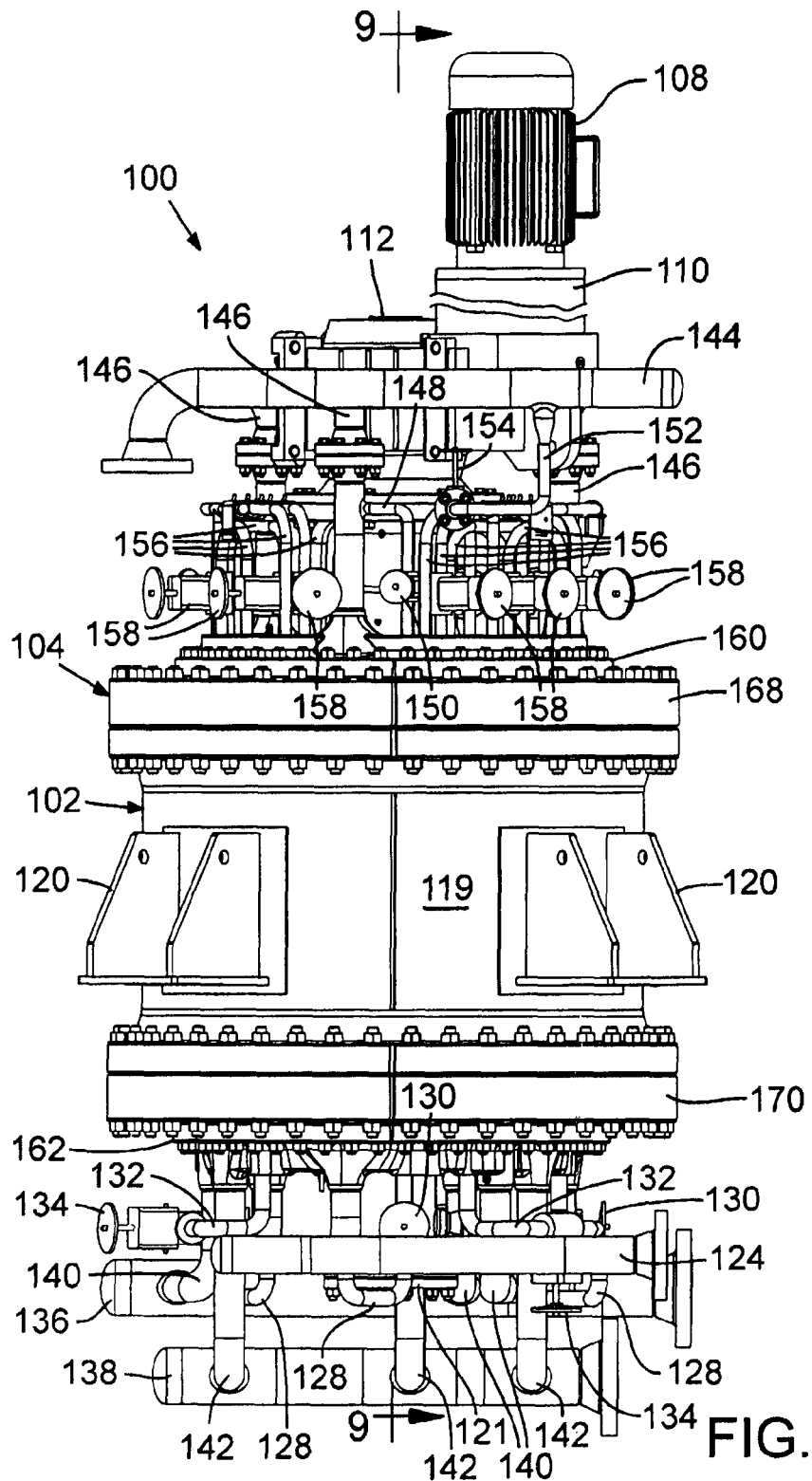
FIG. 4 is a second profile view of the rotary pressure swing device embodiment shown in FIG. 1.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Disclosed herein are embodiments of a rotary pressure swing device, embodiments of components (e.g., a seal assembly) for use with the disclosed rotary pressure swing device, and embodiments of a method for performing a rotary pressure swing process.

Exemplary Device Configuration

FIGS. 1-15 show various views of one embodiment of the disclosed rotary pressure swing device. The illustrated rotary pressure swing device 100 includes a rotor assembly 102 positioned between an upper stator assembly 104 and a lower stator assembly 106. The upper stator assembly 104 includes a motor 108, a coupler housing 110, and a gear box 112. As best seen in FIG. 9, the motor 108, the coupler housing 110, and the gear box 112 can be used to rotate an axle 114 connected to a rotor 116 within the rotor assembly 102. Below the rotor 116, a guide bushing 117 extends from the axle 114 and is received within a slip ring 118 within the lower stator assembly 106. In some embodiments, an indicator, such as a thermocouple, is effectively coupled to the guide bushing 117. The indicator is useful for indicating if axle 114 becomes misaligned during operation. For example, if the indicator is a thermocouple and axle 114 becomes misaligned, the resulting friction on the guide bushing 117 will heat the thermocouple, which can then trigger an alarm and/or send a signal to shut down the rotary pressure swing device 100. The rotor 116 is contained within a rotor housing 119. Support brackets 120 are mounted to the outside surface of the rotor housing 119. Around the slip ring 118, there is an instrument housing 121.

The rotor 116 is useful for rotating adsorber elements 122. Rotation of the rotor 116 cycles fluid flow through each adsorber element 122 as an adsorber element is rotated to receive fluid flow through a fluid port. While various processes can be implemented using disclosed embodiments of rotary pressure swing devices, for one exemplary process each complete cycle includes a high-pressure adsorption stage and a lower-pressure exhaust stage. In addition, some embodiments include one or more reflux stages between the high-pressure adsorption stage and the lower-pressure exhaust stage. Embodiments also can include one or more feed pressurization stages prior to the high-pressure adsorption stage and/or one or more product purge stages prior to the low pressure exhaust stage. Additional details regarding the disclosed rotary pressure swing processes are provided later in this disclosure under the subheading "Exemplary Process Specifications." Pressure transducers (not shown) can be included at one or both ends of representative adsorber elements 122 to generate data for monitoring and calibrating the process cycles. Signals from the pressure transducers can be fed to a controller, such as may be housed in instrument housing 121.

The illustrated embodiments of rotary pressure swing device 100 are configured to perform three complete PSA cycles for each rotation of the rotor 116. The flow paths forming each complete cycle occupy a 120° radial section of the rotary pressure swing device 100. As a result, many elements of the rotary pressure swing device 100 are repeated in groups of three, with similar or identical elements for each section. Other embodiments can be configured to perform a greater or smaller number of PSA cycles per rotation, such as four, two, or one. Including more than one PSA cycle per rotation can be advantageous for efficient product production and for other process considerations, such as to distribute pressure loads more evenly around the circumference of the device and to reduce the overall rotation speed of the device for a given PSA cycle speed.

Figure 6:
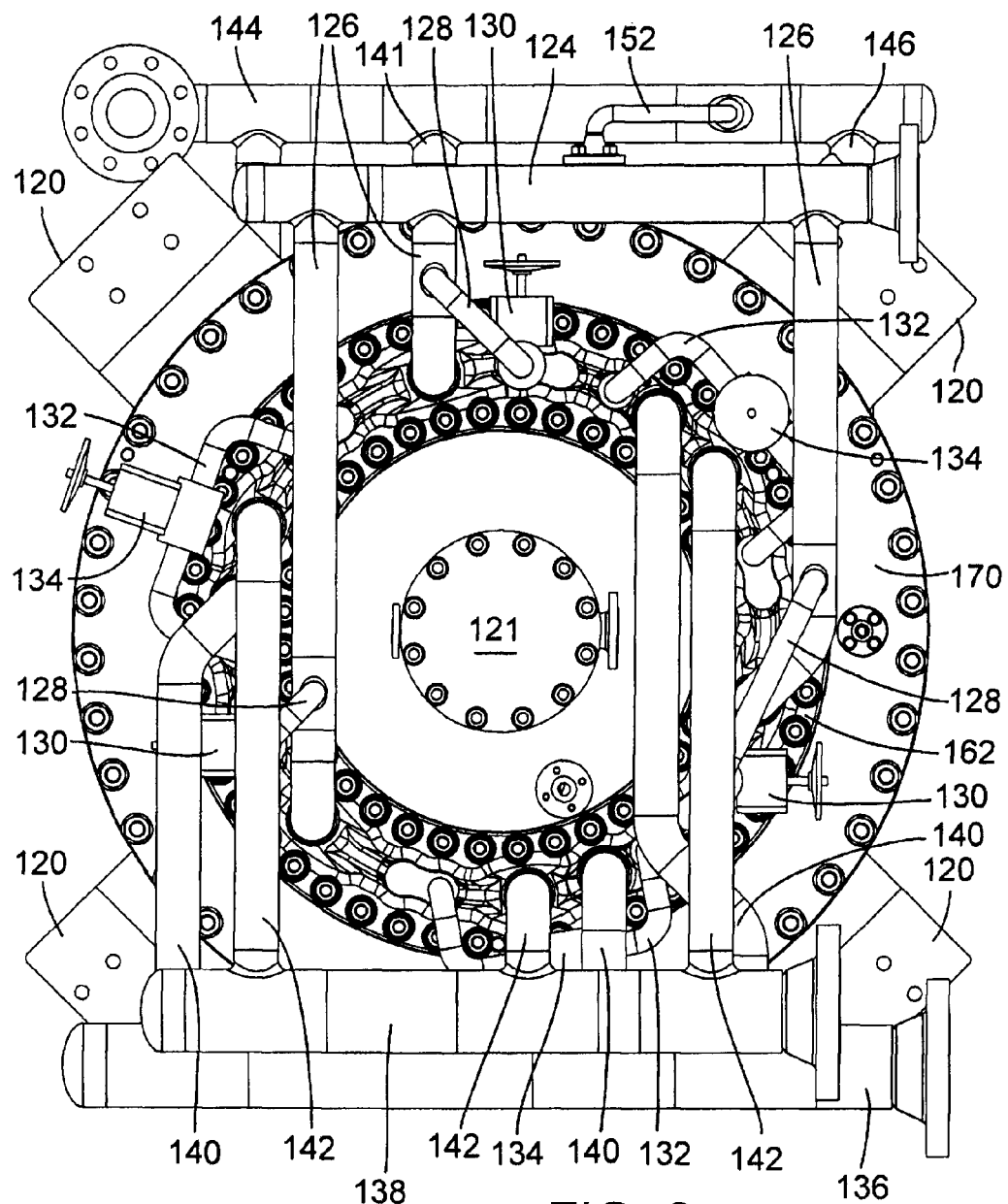
FIG. 6 is a plan view of the bottom of the rotary pressure swing device embodiment shown in FIG. 1.

As best seen in FIG. 6, a fluid feed mixture flows through a feed header 124 and is distributed to each of the three sections of the rotary pressure swing device 100 via feed conduits 126. A feed pressurization conduit 128 branches off from each feed conduit 126. Flow through each feed pressurization conduit 128 can be controlled by a feed pressurization conduit valve 130. The lower stator assembly 106 also includes one lower reflux conduit 132 for each of the three sections of the rotary pressure swing device 100. Flow through each lower reflux conduit 132 can be controlled by a lower reflux conduit valve 134.

The illustrated embodiments of PSA device 100 also typically include a first exhaust header 136 and a second exhaust header 138. Exhaust headers 136 and 138 are located on the opposite side of the lower stator assembly 106 relative to the feed header 124. The first exhaust header 136 receives exhaust from three first exhaust conduits 140. The second exhaust header 138 receives exhaust from three second exhaust conduits 142. Each of the three sections of the rotary pressure swing device 100 includes a first exhaust conduit 140 and a second exhaust conduit 142. Including two exhaust conduits per section allows for two discreet exhaust steps to occur at two different pressure conditions during a cycle. If an exhaust compressor (not illustrated) is utilized, having two exhaust steps per cycle also allows the size of the compressor to be reduced, because the compressor can be attached only on the second exhaust step.

Figure 5:
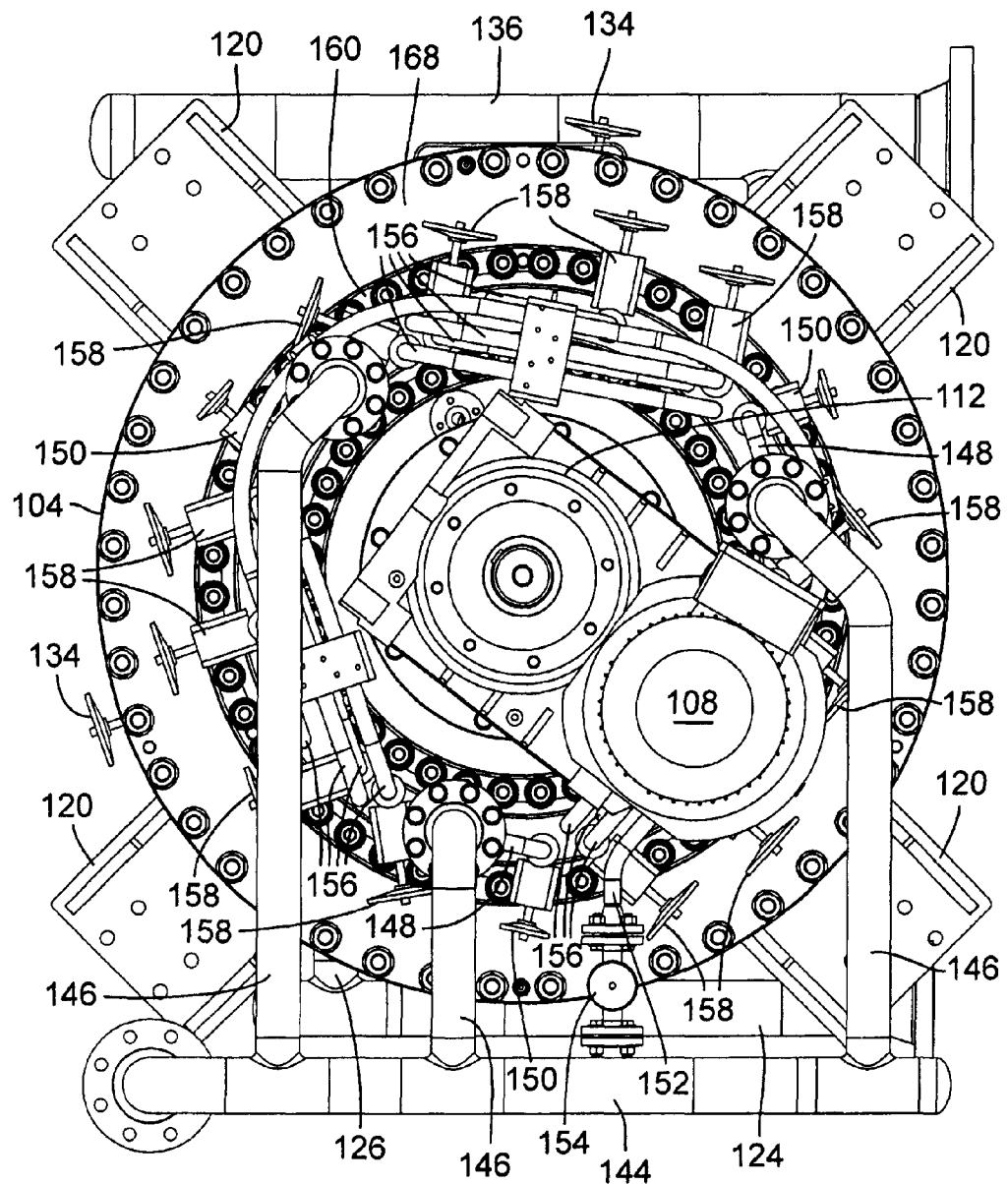
FIG. 5 is a plan view of the top of the rotary pressure swing device embodiment shown in FIG. 1.

The configuration of the upper stator assembly 104 is best seen in FIG. 5.

Product exits the rotary pressure swing device 100 via a product header 144. Product is fed to product header 144 by three product conduits 146, with one product conduit 146 being fluidly coupled to each of the three sections of the rotary pressure swing device 100. A product pressurization conduit 148 is connected to each of the product conduits 146. Flow through each product pressurization conduit 148 can be controlled by a product pressurization conduit valve 150. A product purge conduit 152 is fluidly coupled to the product header 144 to deliver purge fluid, which can be product fluid, to the adsorber elements 122. Flow through the product purge conduit 152 can be controlled by a product purge conduit valve 154. In an alternate embodiment, three separate product purge conduit valves can be used to control three independent product purge conduits, one for each of the three sections in the overall device. The upper stator assembly 104 also includes upper reflux conduits 156. Each section of the rotary pressure swing device 100 includes three upper reflux conduits 156, each including an upper reflux conduit valve 158.

Figure 7:
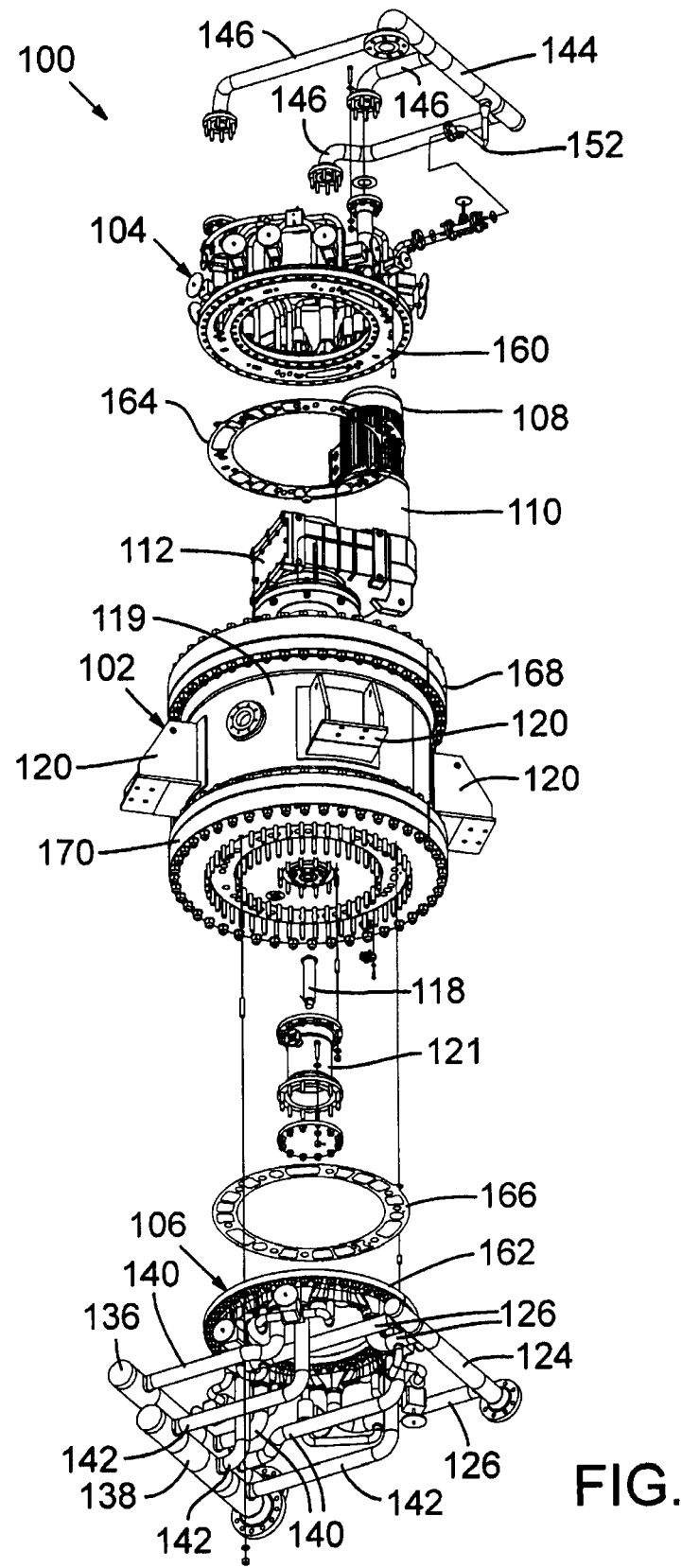
FIG. 7 is an exploded perspective view of the rotary pressure swing device embodiment shown in FIG. 1.
Figure 8:
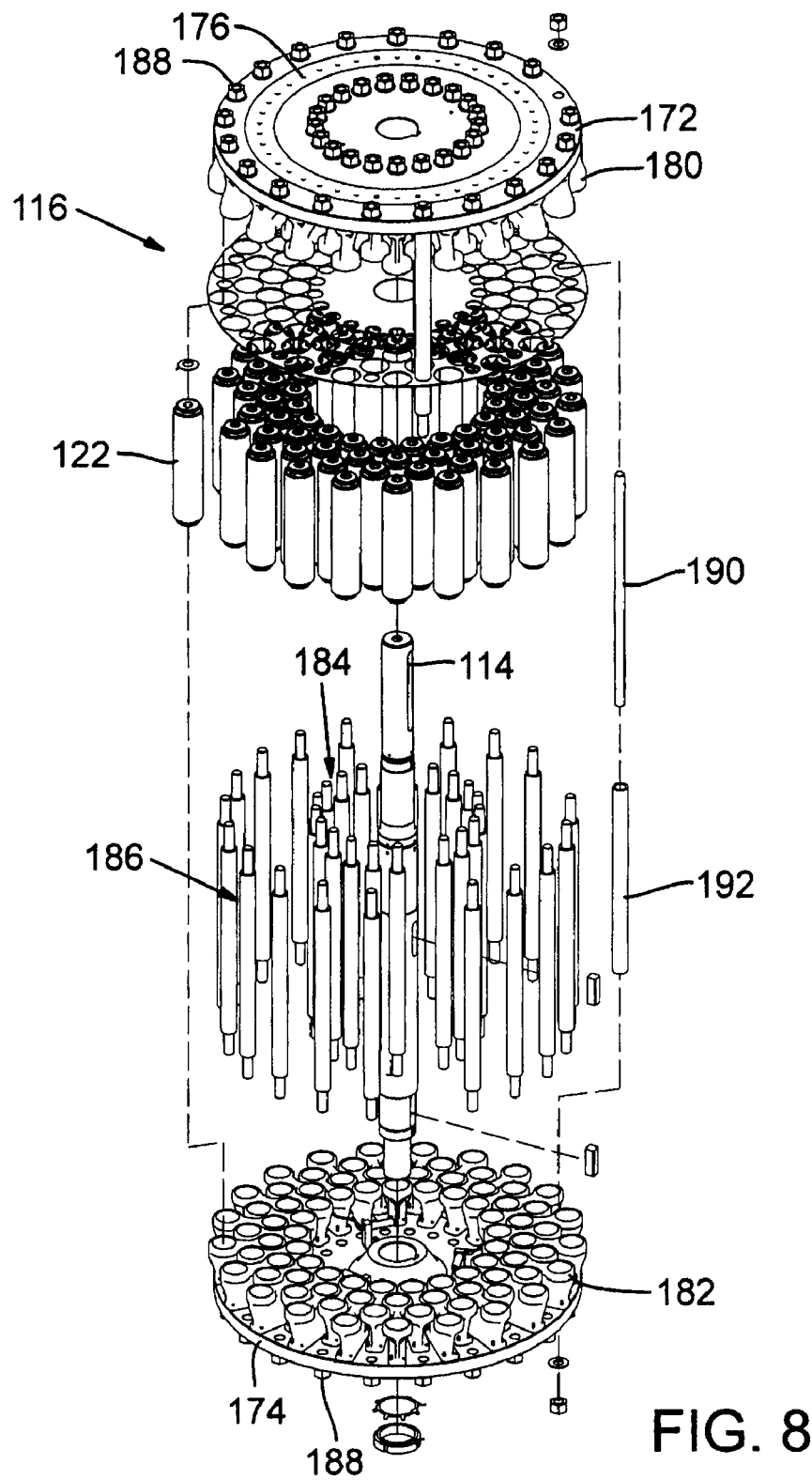
FIG. 8 is an exploded perspective view of the rotor of the rotary pressure swing device embodiment shown in FIG. 1.
Figure 9:
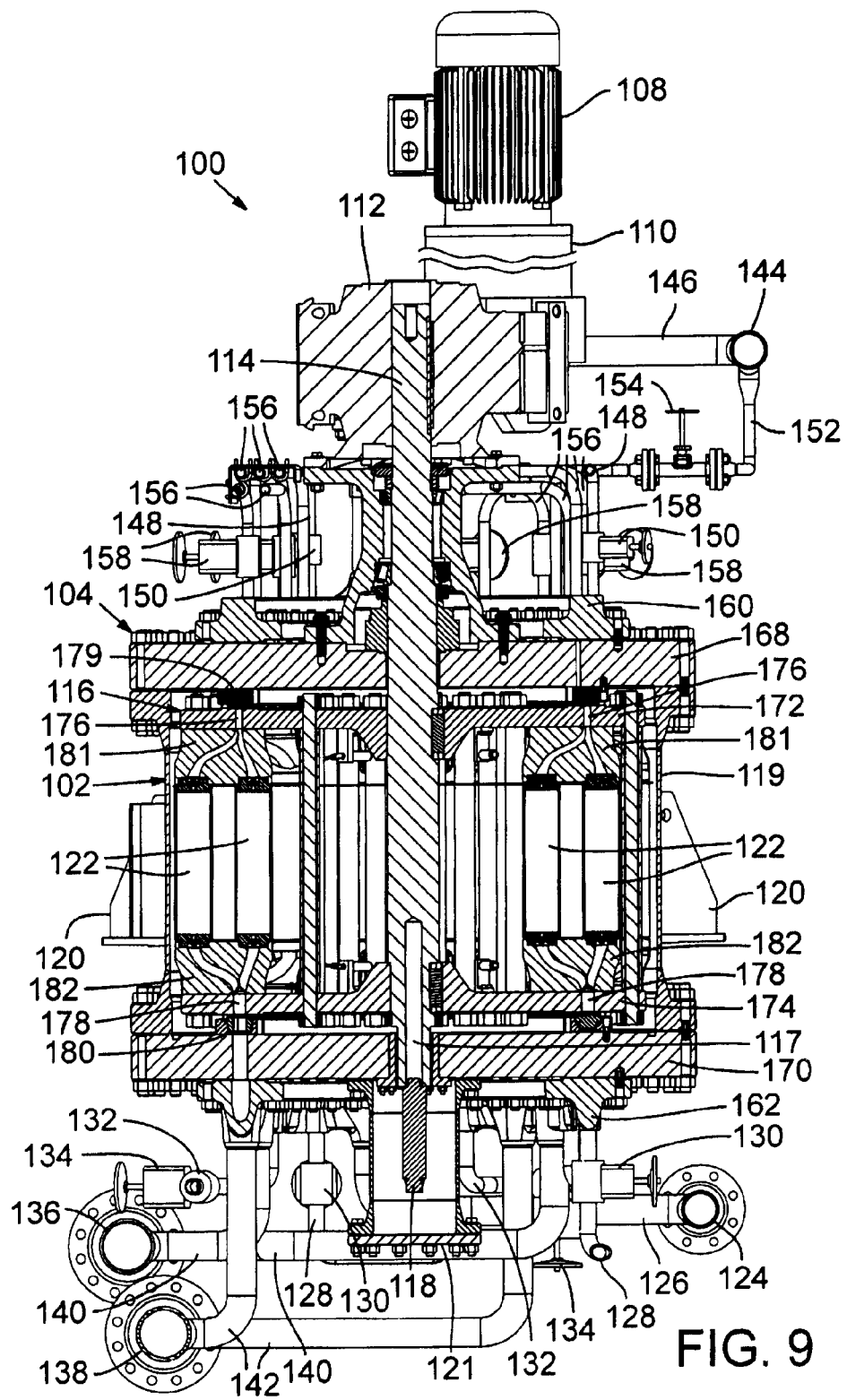
FIG. 9 is a cross-sectional view of the rotary pressure swing device embodiment shown in FIG. 1 taken along the line 9-9 in FIG. 4.
Figure 10:
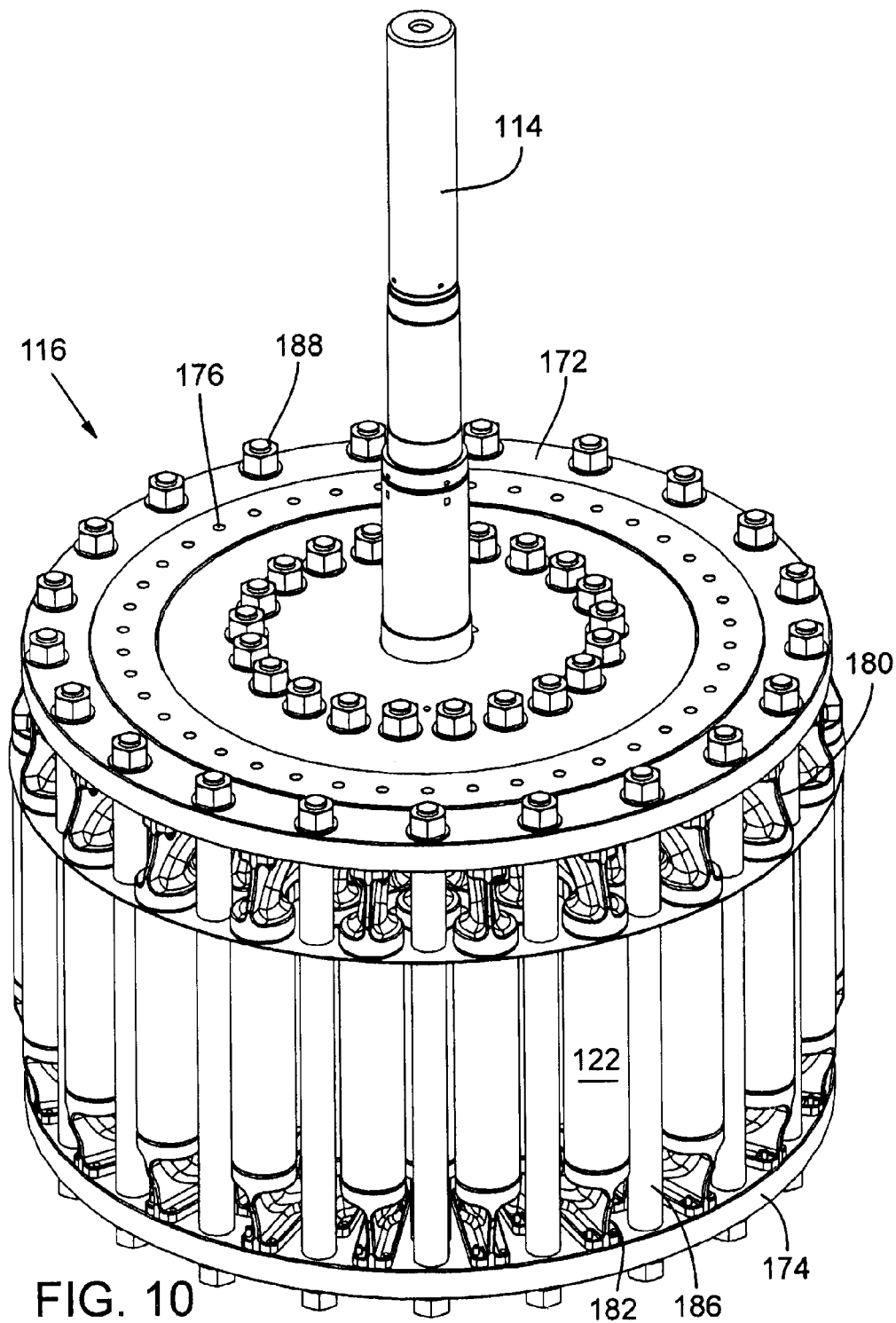
FIG. 10 is a first perspective view of the rotor of the rotary pressure swing device embodiment shown in FIG. 1.

With reference to FIG. 7, an exploded view of the rotary pressure swing device 100, the upper stator assembly 104 includes an upper transition casting 160 to fluidly couple various fluid conduits to flow entering or exiting the rotor 116 (shown in FIGS. 8 and 9). Similarly, the lower stator assembly 106 includes a lower transition casting 162 to connect its various conduits to flow entering or exiting the rotor 116 (shown in FIGS. 8 and 9). Below the upper transition casting 160 and above the lower transition casting 162 are an upper gasket seal 164 and a lower gasket seal 166, respectively. The upper and lower gasket seals 164, 166 isolate fluid ports from each other and to reduce or substantially preclude fluid leakage at the interfaces between upper and lower transition castings 160, 162 and the upper and lower stator assemblies 104, 106, respectively.

Figure 11:
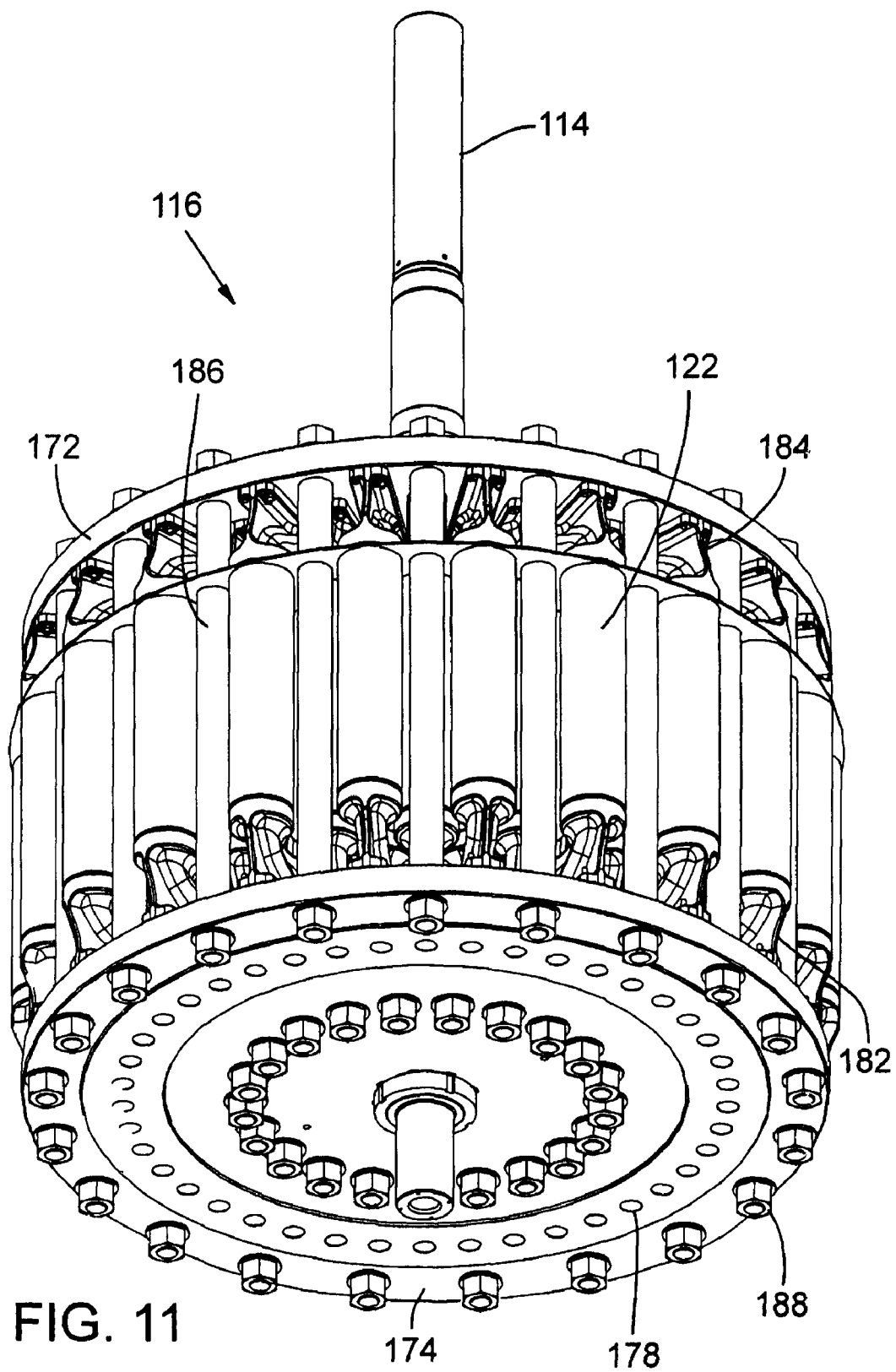
FIG. 11 is a second perspective view of the rotor of the rotary pressure swing device embodiment shown in FIG. 1.
Figure 12:
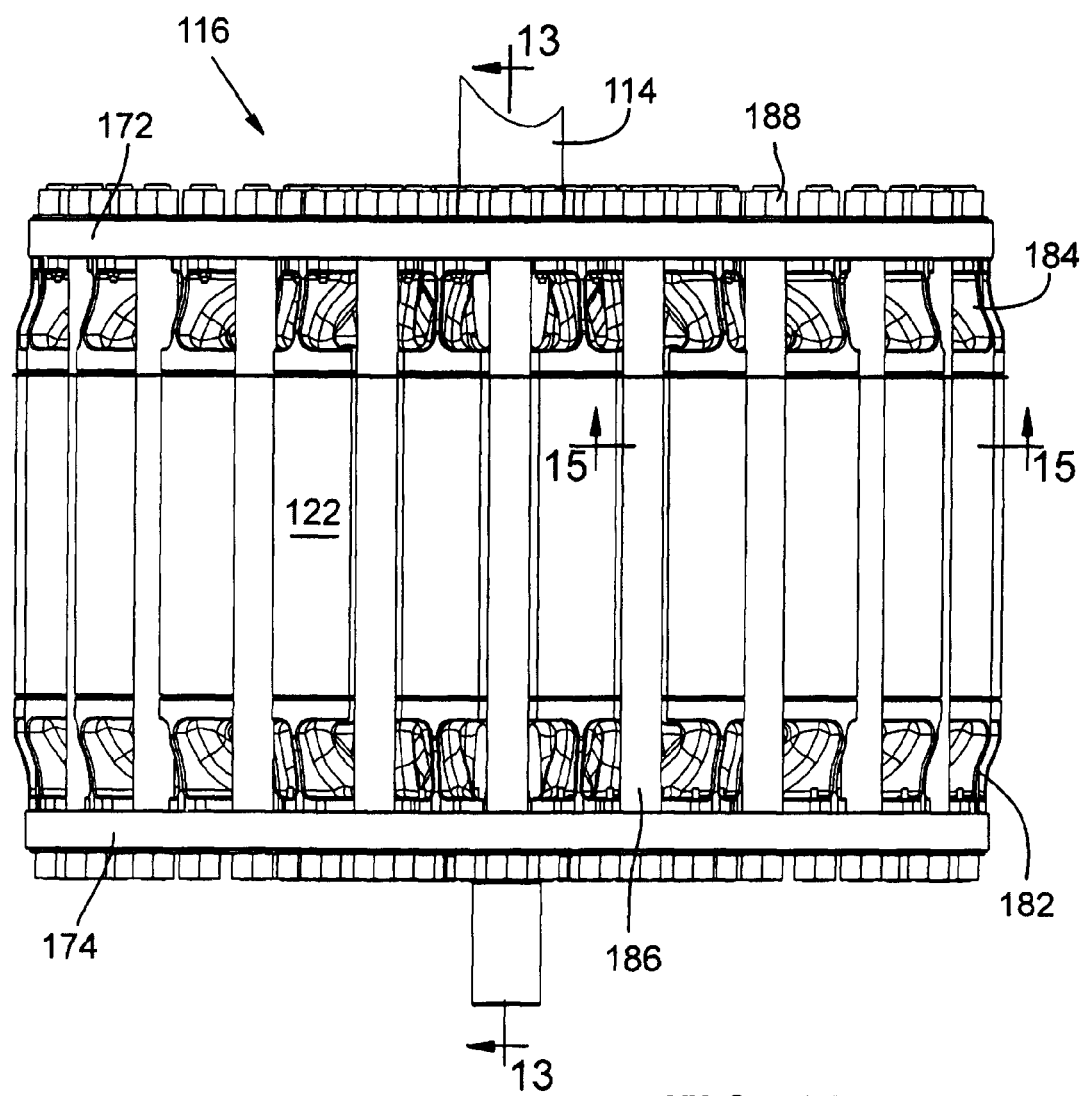
FIG. 12 is a profile view of the rotor of the rotary pressure swing device embodiment shown in FIG. 1.
Figure 14:
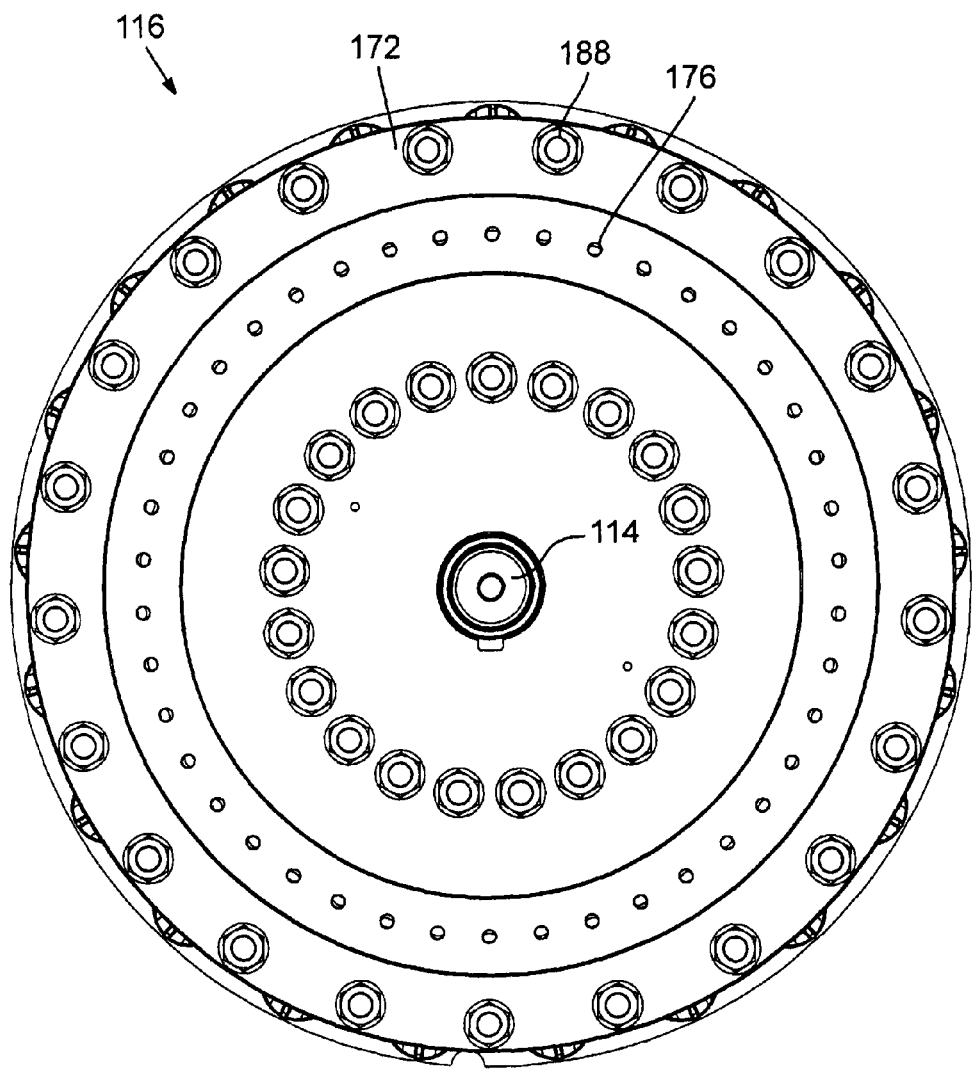
FIG. 14 is a plan view of the top of the rotor of the rotary pressure swing device embodiment shown in FIG. 1.
Figure 15:
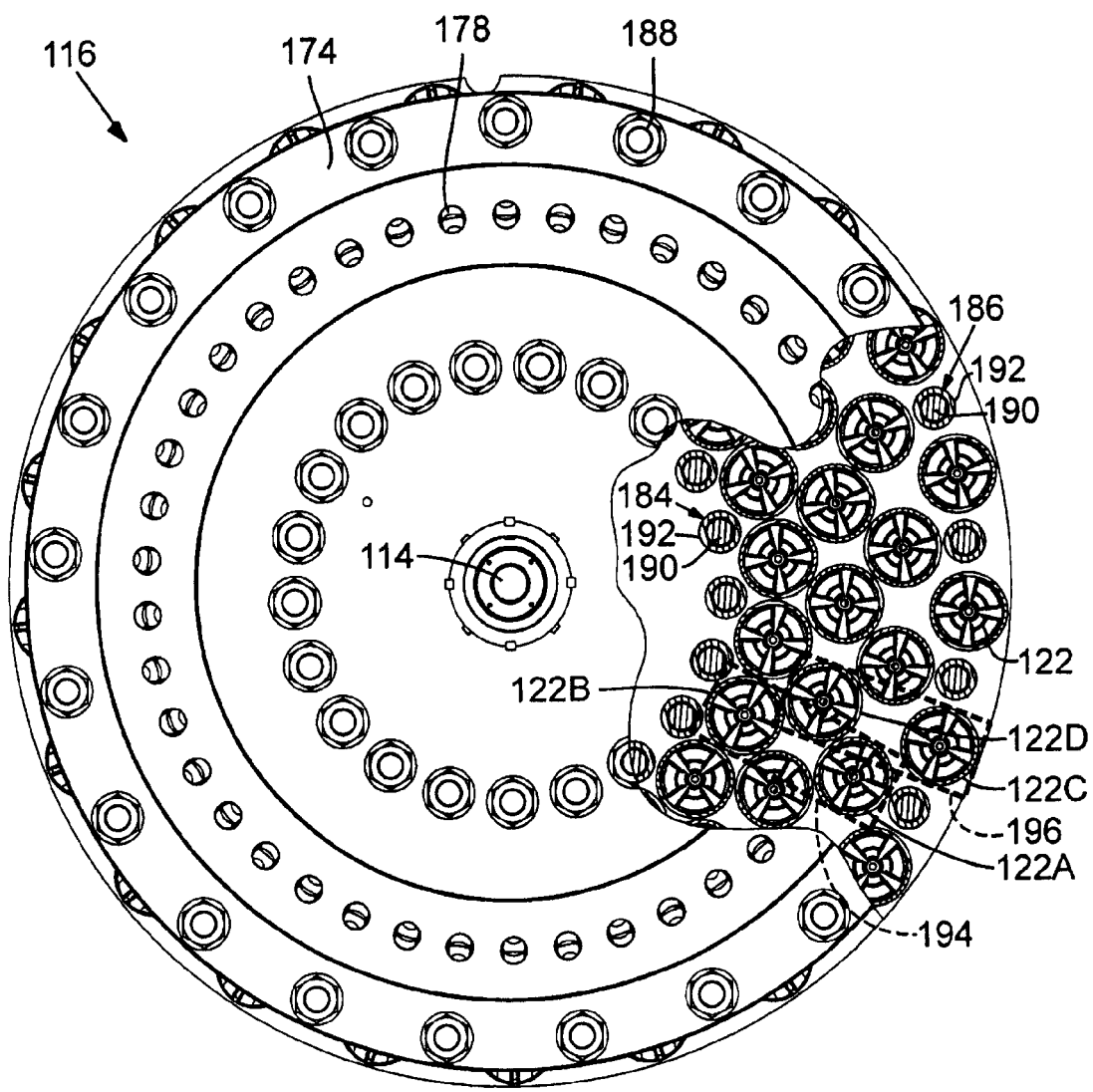
FIG. 15 is a plan view of the bottom of the rotor of the rotary pressure swing device embodiment shown in FIG. 1 with a portion cut away to show the cross-section taken along the line 15-15 in FIG. 12.

Below the upper gasket seal 164, the upper stator assembly 104 includes an upper stator plate 168. Similarly, above the lower gasket seal 166, the lower stator assembly 106 includes a lower stator plate 170. The upper and lower stator plates 168, 170 are effectively coupled, such as by being bolted, to the upper and lower transition castings 160, 162, respectively. The upper and lower stator plates 168, 170 also are effectively coupled to the rotor housing 119. As shown in FIG. 11, the rotor 116 includes an upper rotor end plate 172 and a lower rotor end plate 174. The upper rotor end plate 172 includes a ring of upper rotor apertures 176, as shown in FIG. 14. The lower rotor end plate 172 includes plural lower rotor apertures 178 arranged circumferentially around rotor end plate 172, as shown in FIG. 15.

Figure 13:
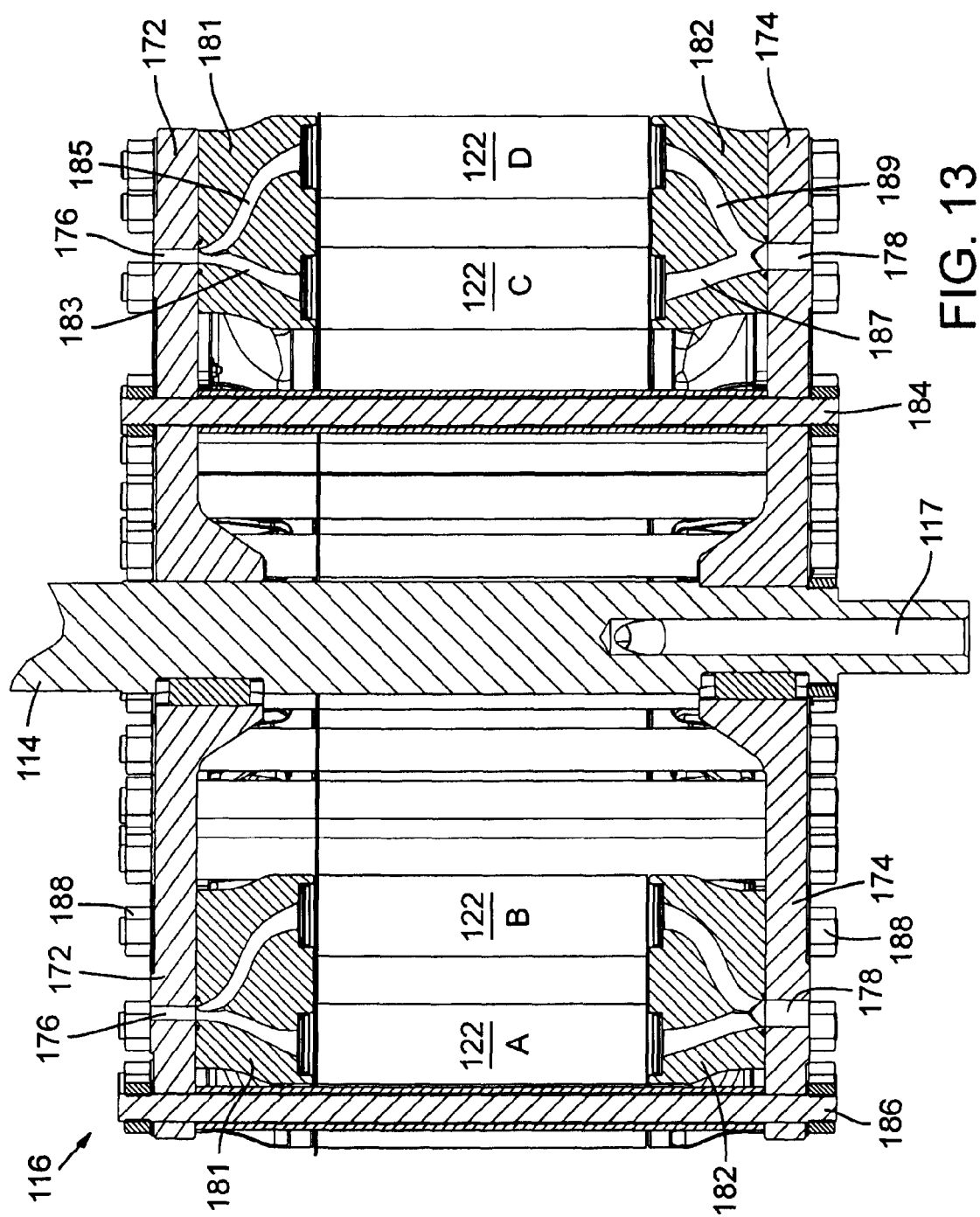
FIG. 13 is a cross-sectional view of the rotor of the rotary pressure swing device embodiment shown in FIG. 1 taken along the line 13-13 in FIG. 12.

FIGS. 9 and 13 show cross sections of the rotor 116. In the illustrated embodiment, the upper rotor apertures 176 have a smaller diameter than the lower rotor apertures 178. This helps optimize fluid flow for different gas compositions that occur at each end of the rotary pressure swing device 100. As shown in FIG. 9, an upper seal assembly 179 is positioned between the upper stator plate 168 and the upper rotor end plate 172. Similarly, a lower seal assembly 180 is positioned between the lower stator plate 170 and the lower rotor end plate 174.

Again with reference to FIGS. 9 and 13, the upper rotor apertures 176 are fluidly coupled to the top ends of the adsorber elements 122 within the rotor 116 via upper y-manifolds 181. Similarly, the lower rotor apertures 178 are fluidly coupled to bottom ends of the adsorber elements 122 within the rotor 116 via lower y-manifolds 182. Upper and lower y-manifolds 181, 182 allow two parallel adsorber elements 122 to essentially function as one. For example, flow between a single pair of upper and lower rotor apertures 176, 178 can be split between two parallel adsorber elements 122. In other embodiments, the upper and lower rotor apertures 176, 178 can communicate with only one adsorber element 122 at a time or can communicate with three, four or a greater number of adsorber elements simultaneously.

Packing efficiency may be improved by using a greater number of relatively small adsorber elements 122 in multiple rows, rather than a smaller number of relatively large adsorber elements arranged in a single row. In the illustrated embodiment (see, for example, FIG. 8), each of the three sections of the rotary pressure swing device 100 includes 14 pairs of adsorber elements 122 or 28 individual adsorber elements. Thus, the overall rotary pressure swing device 100 includes 42 pairs of adsorber elements 122 or 84 individual adsorber elements. Of course, different embodiments can have different numbers of adsorber elements in different spatial arrangements. Many design features of the rotary pressure swing device 100 are considered when selecting the arrangement of the adsorbent elements 122. Such features include the overall pitch circle diameter of the upper and lower gasket seals 164, 166, the rotation speed, the gas flow efficiency, and dead gas volume.

FIG. 8 is an exploded view of the rotor 116. As shown, a ring of inner tie rods 184 and a ring of outer tie rods 186. Each of the inner and outer tie rods 184, 186 includes a threaded central shaft 190 partially encased within a spacer sheath 192. The ends of the central shafts 190 protrude beyond the ends of the spacer sheaths 192. The inner and outer tie rods 184, 186 are secured at their top end and their bottom end with nuts 188 pressing against the outer surfaces of the upper and lower rotor end plates 172, 174, respectively. Once secured, the top and bottom ends of the spacer sheaths 192 press against the inner surfaces of the upper and lower rotor end plates 172, 174, respectively. This allows for precise control of the position and flatness of the upper and lower rotor end plates 172, 174 without putting unwanted loads on the adsorbent elements 122.

FIG. 15 includes a partial cut-away showing the arrangement of the adsorber elements 122 in the rotor 116 for the illustrated embodiment of PSA device 100. As discussed above, the adsorber elements 122 can be arranged in pairs. Packing efficiency may be improved by arranging the pairs in a nested, interlocking, radial pattern. For illustration, a first box 194 encompasses an inner pair of adsorber elements 122A, 122B, and a second box 196 encompasses an outer pair of adsorber elements 122C, 122D. The adsorber elements 122 of the inner pair and the adsorber elements of the outer pair communicate with adjacent upper and lower rotor apertures 176, 178. First and second boxes 194, 196 overlap. Thus, a portion of adsorber element 122A in the inner pair is positioned between adsorber elements 122C, 122D in the outer pair and a portion of adsorber element 122D in the outer pair is positioned between adsorber elements 122A, 122B in the inner pair. This nested configuration allows for closer packing of adsorber elements 122 than would be possible if the pairs of adsorber elements were arranged in a uniform ring and allows for uniform fluid flow to all of the adsorber elements 122.

With reference to FIGS. 9 and 13, communication between the rings of upper and lower rotor apertures 176, 178 and the staggered pairs of adsorber elements 122 is achieved by the orientation and arrangement of the upper and lower y-manifolds 181, 182. Specifically, the upper and lower y-manifolds 181, 182 are staggered and each y-manifold is flipped on its vertical axis relative to the adjacent y-manifolds. Upper manifold 181 includes fluid channels 183, 185 of different lengths. Similarly, lower manifold 182 includes fluid channels 187, 189 of different lengths. Since the upper and lower y-manifolds 181, 182 each include two flow channels of different lengths, staggering them and flipping them on their vertical axes allows all the flow paths to terminate in a uniform ring. The cross sectional views in FIGS. 9 and 13 illustrate this point. In FIGS. 9 and 13, the adsorber elements 122A, 122B on the left side of the rotor 116 represent an inner pair, while the adsorber elements 122C, 122D on the right side of the rotor represent an outer pair. The upper and lower y-manifolds 181, 182 on the left have longer flow channels entering the adsorber element 122 closer to the axle 114 and shorter flow channels entering the adsorber element further from the axle 114. In contrast, the upper and lower y-manifolds 181, 182 on the right have shorter flow channels entering the adsorber element 122 closer to the axle 114 and longer flow channels entering the adsorber element further from the axle 114. As a result of this configuration, all of the flow channels 185, 187 terminate in uniform rings in alignment with the upper and lower rotor apertures 176, 178.

Exemplary Adsorber Elements

FIGS. 16 and 17 illustrate one embodiment of an adsorber element suitable for use with embodiments of the disclosed rotary pressure swing device. As shown in FIG. 17A, the adsorber element 200 includes plural adsorbent beds. For example, one embodiment includes a first radial adsorber 202, a second radial adsorber 204, a third radial adsorber 206, and a fourth radial adsorber 208. The first, second, third, and fourth radial adsorbers 202, 204, 206, 208 are laminate sheets concentrically wound about first, second, third, and fourth mandrels 210, 212, 214, 216, respectively. Optional spacers can be used to space adsorbers. For example, three epoxy spacer crosses 218 are positioned between the first and second radial adsorbers 202, 204, the second and third radial adsorbers 204, 206, and the third and fourth radial adsorbers 206, 208, respectively. The epoxy spacer crosses 218 help prevent axial displacement of the laminate sheets as a result of pressure fluctuations. Adsorber element 200 includes a feed bed connector 220 adjacent the first radial adsorber 202, and a product bed connector 222 adjacent to the fourth radial adsorber 208.

A tie rod 224 extends between the feed bed connector 220 and the product bed connector 222 through the first, second, third, and fourth mandrels 210, 212, 214, 216. Two fasteners, such as nuts 226, at each end of the tie rod 224 press against recessed ledges 227 of the feed bed connector 220 and the product bed connector 222, respectively. Thus, it is possible to apply a compression force to the internal components of the adsorber element 200 along the length of the tie rod 224 by tightening one or both of the nuts 226. Housing 228 extends around the internal components of the adsorber element 200 between the feed bed connector 220 and the product bed connector 222. Two housing o-rings 230 are positioned around the feed bed connector 220 and the product bed connector 222, respectively, to facilitate fluidly sealing housing 228 to the feed bed connector and the product bed connector. Similarly, two connector o-rings 232 are positioned around the feed bed connector 220 and the product bed connector 222, respectively, to facilitate fluidly sealing the feed bed connector and the product bed connector to other portions of the overall rotary pressure swing device 100. For example, in the rotary pressure swing device 100, the feed bed connector 220 and the product bed connector 222 can be sealed into a lower y-manifold 182 (FIG. 9) and an upper y-manifold 181 (FIG. 9), respectively.

As shown in FIG. 17A, embodiments of adsorber elements (e.g., the illustrated adsorber element 200) suitable for use with embodiments of the disclosed rotary pressure swing device 100 typically include two or more sections, and each may contain a different adsorbent material or a different combination of adsorbent materials. As used herein, the term "adsorbent material" refers to particular types of adsorbent material and to particular combinations of types of adsorbent material. Adsorbent materials can be selected for certain functions, such as to separate hydrocarbons from hydrogen-containing fluids. For example, a series of adsorbent materials can be selected to adsorb progressively lighter hydrocarbons, leaving a hydrogen product. The adsorbent materials can be arranged in order of hydrocarbon affinity with the adsorbent material having the lowest hydrocarbon affinity positioned closer to the feed entrance of the adsorber element than the adsorbent material having the highest hydrocarbon affinity. Adsorbent materials also can be used for different purposes, such as to adsorb particular contaminants, such as water. Each adsorber also can include combinations of adsorbent materials.

The adsorber sections described herein comprising various adsorbent materials can comprise the adsorbent materials in any concentration greater than zero. In some embodiments, however, the adsorbent sections comprise the specified adsorbent materials in a concentration greater than about 30%, greater than about 50%, greater than about 70%, greater than about 90%, or greater than about 95%.

Different types of adsorbent materials suitable for use in embodiments of the disclosed adsorber element include, without limitation: alumina, silica, activated carbon, zeolites, and mixtures and derivatives thereof. Many different variations of each of these types of adsorbent materials are available. For example, some disclosed embodiments include activated carbon having different surface areas. Different adsorbent materials have different affinities for particular fluid components. For example, alumina, silica, and activated carbon have increasing affinities for hydrocarbons.

Some disclosed embodiments include at least one adsorbent material having a low affinity for a particular fluid component, at least one adsorbent material having an intermediate affinity for the fluid component, and at least one adsorbent material having a high affinity for the fluid component. In embodiments in which the adsorber element is configured to adsorb multiple fluid components (e.g., hydrocarbons), the low-affinity adsorbent material can be used to adsorb the heaviest fluid components, the intermediate-affinity adsorbent material can be used to adsorb the intermediate-weight fluid components, and the high-affinity adsorbent material can be used to adsorb the lightest fluid components.

Some of the disclosed adsorber element embodiments include alumina, silica, and activated carbon. For example, some embodiments include alumina, silica and two types of activated carbon with increasing affinities for hydrocarbons. This combination, positioned in order from the feed entrance of the adsorber element to the exit of the adsorber element, has been found to be particularly effective for separating hydrocarbons from fluids comprising hydrocarbons and hydrogen. Each of these adsorbent materials can be used in sections of the adsorber element either alone or as part of a mixture. For example, a segmented adsorber element can include, positioned in order from its feed entrance to its exit, (1) a section comprising alumina, (2) a section comprising alumina and silica, (3) a section comprising silica, (4) a section comprising silica and activated carbon, and (5) a section comprising activated carbon.

Adsorbent material can be incorporated into disclosed adsorber element embodiments in a variety of forms. In some embodiments, the adsorbent material is in a granular form. In other embodiments, the adsorbent material is in a laminate form. As used herein, the term "laminate" refers to a structure formed from a support material and at least one adsorbent material, and perhaps other materials, (e.g., catalysts), over, about or through which a mixture of gasses can be flowed for gas adsorption, separation and/or a gas phase chemical reaction. Laminates can be rolled, stacked or otherwise arranged within an adsorber element to provide the desired surface area and pressure drop. In general, laminates allow for rapid cycling and gas exchange.

Laminate structures are particularly well-suited for use in segmented adsorber elements. Unlike beads and other granular adsorbent forms, laminates typically can be made into cohesive shapes. For example, multiple laminate sections can be shaped and then placed end-to-end within a shell. Spacers can be used to define a consistent separation between the laminate layers. Laminates generally minimize mass transfer resistances by providing a high surface-area-to-volume ratio and by providing a structure with a uniform, minimum thickness to support the adsorbent material. Laminates make efficient use of limited quantities of adsorbent material, so they also typically are beneficial with respect to size, weight and cost. Furthermore, laminates and spacers typically provide a structure that is more robust than beaded or pelletized packed adsorbent material, which is important in applications characterized by frequent and severe vibration and shock loading, such as PSA applications.

The laminates in embodiments of the disclosed rotary pressure swing device can be, for example, sheets of immobilized adsorbent material coated on wire mesh.

The thickness of these sheets can vary depending on the type of adsorbent material. For example, activated alumina laminates can be about 0.0065 inches thick and other laminates can be about 0.0105 inches thick. Laminates in disclosed adsorber element embodiments can be arranged in various forms, such as stacked or spirally-wound. A spacer layer can be included between the laminates. For example, some embodiments include uncoated wire mesh as a spacer material wound between sheets of immobilized adsorbent material. The thickness of the spacer layer can vary depending on the type of adsorbent material on the laminates. For example, the thickness of the spacer layer can be about 0.007 inches for activated alumina laminates and about 0.0059 for laminates made with other adsorbent materials.

Additional examples of suitable adsorbents, catalysts, and laminate structures for use with adsorber elements of the disclosed rotary pressure swing device are provided by U.S. Pat. Nos. 4,702,903, 4,801,308 and 5,082,473 and in U.S. Patent Application Publication No. 2002/0170436, all of which are incorporated herein by reference.

The greatest threat to the durability of laminate structures typically is displacement of one laminate layer relative to an adjacent laminate layer. Displacement can occur in response to the forces associated with repeatedly switching the direction of fluid flow through the laminate structures. Spirally-wound laminate structures are particularly susceptible to axial displacement, which can occur, for example, by the telescoping of nested rings of laminate layers. Displacement causes abrasion that can damage the spacers and/or the adsorbent materials. Continued abrasion can decrease the operable life of the adsorber element.

In some embodiments, support structures are included to reduce displacement. Examples of support structures include the epoxy spacer crosses 218 illustrated best in FIGS. 17A and 17B. Such support structures can be positioned between multiple, separate laminate structures or at one or both ends of individual laminate structures. Support structures typically include one or more elongated portions 218a (e.g., spokes) extending across the face of the laminate structures substantially perpendicular to the direction of possible displacement, such as the axial direction of spirally-wound laminate structures or the direction of fluid flow through the adsorber element. These elongated portions can be rigid or flexible and can be sized so as to minimize the disruption of fluid flow through the overall adsorber element.

The support structures can be bonded to none, one, or both of the adjacent laminate structures. In some embodiments, such as the adsorber element 200 illustrated in FIGS. 16 and 17A, the support structures comprise an adhesive material, such as an epoxy, capable of bonding to one or both of the adjacent laminate structures. The adhesive material can be activated, for example, by heating the overall adsorber element, such as while activating the adsorbent materials. The support structures also may be solely an adhesive material, such as an epoxy. Adhesive materials often can be applied expediently to the faces of laminate structures, such as by deposition in gel form. These materials then can be allowed to set to become strong enough to resist laminate displacement.

A preferred embodiment comprises spacer cross support structures 218 that are formed by applying liquid epoxy resin to the ends of the laminate structures in the shape of a cross. A template may be employed to assist in applying beads of epoxy in order to form an appropriate cross shape 218a. The epoxy is also applied so as to seal against a central mandrel 210 (as discussed further below). The epoxy resin can thus work its way to some significant extent into the ends of the wound laminate structure and, after curing, thereby provide useful support against collapse of the windings at the ends. This can be a significant improvement over simply using a preformed supports as these do not provide support between the actual winds in the laminate structure itself.

Mandrels, such as mandrels 210, 212, 214, 216 of the adsorber element 200, can be attached to inner surfaces of laminate structures and constrained from axial movement. This helps to hold the laminate structures in place. The attachment can result by any suitable means, such as by adhesive bonding. In addition, adsorber element housings can be used to help hold the laminate structures in a desired position. For example, a laminate structure can be placed into a housing, and then a substantially uniform concentric compressive force applied to the housing to deform it about the laminate structure to reduce or substantially prevent axial movement of the windings. To further reduce or substantially prevent movement of the laminate structures and to reduce or substantially prevent gas flow out of the housing, a bead of material, such as a ceramic material, can be placed about the inner circumference of the shell. In the adsorber element 200, a filter can be positioned to contact this bead. Other methods of fastening also can be used, such as a shoulder built into the shell. Sealants suitable for attaching laminate structures to shells include epoxy resins, such as LOCTITE® HYSOL® E-120 HP epoxy available from Henkel Corporation (Rocky Hill, Conn.). For high temperature applications (e.g., greater than about 130° C.), suitable sealants include PYRO-PUTTY® 653 available from Aremco Products, Inc. (Valley Cottage, N.Y.).

Mandrels, housings and other components (e.g., support structures) of disclosed adsorber elements can be made from a variety of materials, such as metals and metal alloys (e.g. stainless steel), ceramics and/or polymeric materials. In some embodiments, the shell and/or the mandrel have a thermal conductivity at room temperature of from about 10 to about 1000 W/(m·° C.), such as from about 20 to about 1000 W/(m·° C.) or from about 50 to about 1000 W/(m·° C.). The adsorbent materials used to form laminate structures can be activated, if necessary, subsequent to insertion into the housing. In such cases, both the housing and the mandrel are sufficiently robust to withstand the adsorbent-activation temperature, such as temperatures of about 250° C. and greater. For adsorbent materials that can be activated at lower temperatures, the material used to form the shell and mandrel can be other than metals, metal alloys, ceramics, etc.

Exemplary Seals

FIGS. 18-21 illustrate an embodiment of the upper seal assembly 179 shown in FIG. 9. In the rotary pressure swing device 100, the upper seal assembly 179 is attached to the upper stator plate 168 and is stationary during operation. In other embodiments, the upper seal assembly 179 can be attached to the upper rotor end plate 172 and rotate during operation. The lower seal assembly 180 is comparable in structure to the upper seal assembly 179, so only the upper seal assembly is illustrated and described in detail. Both assemblies however serve as part of rotary distributor valves to distribute gases to and from the various adsorber elements at appropriate times during the pressure swing cycle, and yet also provide an adequate seal against leakage of these gases. As the rotor rotates between the seal assemblies, valve action is provided as apertures in the stators and rotor come into and then out of alignment.

As shown in FIG. 19, the upper seal assembly 179 includes an upper portion 300 and a lower portion 302. The upper portion 300 also can be referred to as the "seal backer" and the lower portion 302 also can be referred to as the "floating seal." The upper portion 300 includes apertures 303 (with only one aperture being numbered in FIGS. 18 and 19) corresponding to apertures in the upper stator plate 168. Process gases flow though the apertures 303 during operation of the rotary pressure swing device 100. The lower portion 302 includes projections 304 (one numbered in FIG. 19) extending upward from a base 306. Flow ports 307 (one numbered in FIG. 19) corresponding to the apertures 303 in the upper portion 300 extend through the entire lower portion 302.

The projections 304 may have various shapes and sizes, as illustrated in FIG. 19, to fit within individually-defined recesses 305 on the underside of the upper portion 300. FIGS. 20A and 20B are cross sectional views that better illustrate this relationship. FIG. 20A shows a view taken through a projection 304 at a location with no flow port. FIG. 20B shows a view taken through a projection 304 at a location where there is a flow port 307. Sealing face 309 is also wider in FIG. 20A than in FIG. 20B. In each Figure, the lower portion 302 is free to move vertically relative to the upper portion 300 in response to pressure forces. Below the base 306, the lower portion 302 includes a wear portion 308 with a sealing face 309. Sliding contact with the upper rotor end plate 172 occurs at the sealing face 309. The projection 304 has a top surface 310 and portions of the base 306 on either side of the projection form ledges 312.

As shown in FIGS. 20A and B, there is a first chamber 314 between the top surface 310 of the projection 304 and the upper portion 300. FIGS. 20A and B also show a second chamber 316 between the ledges 312 and the upper portion 300. The second chamber 316 is substantially sealed so that the pressure in the second chamber can be independently controlled. As shown in FIGS. 19 and 20A and B, inner and outer base-sealing o-rings 318, 320 encircle inner and outer surfaces, respectively, of the base 306 of the entire lower portion 302. Projection-sealing o-rings 322 (one numbered in FIG. 19) surround the side surfaces of each individual projection 304. Together, the inner and outer base-sealing o-rings 318, 320 and the projection-sealing o-rings 322 seal the illustrated portions of the second chamber 316, which are connected by spaces between the projections 304. In addition, the first chamber 314 above each individual projection is sealed from the first chambers above adjacent projections by the projection-sealing o-rings 322 and dividers (not shown) between the individually-defined recesses on the underside of the upper portion 300. A pressurization port 324 (FIGS. 18 and 19) is fluidly coupled to a high-pressure gas source (e.g., 100 psi nitrogen) and to the second chamber 316. Typically, an appropriate pressure in the second chamber 316 is determined during initial set-up and, in some cases, monitored at scheduled intervals thereafter. It is possible, however, for an operator to monitor the pressure in the second chamber 316 continuously or near-continuously and reduce or increase the pressure as needed via the pressurization port 324.

It is advantageous to provide sufficient closing force at the sealing face 309 to prevent substantial material loss, while still minimizing friction that can increase torque and cause excessive wear on the sliding parts. The illustrated upper seal assembly 179 includes several features that facilitate achieving an appropriate closing force. FIG. 21A is a schematic, cross sectional view showing the pressures acting on different surfaces of the lower portion 302 during operation of the rotary pressure swing device 100. As in the cross section shown in FIG. 20B, FIG. 21A shows a flow port 307 through the center of the lower portion 302. Arrows 326 (one numbered in FIG. 21A) indicate the "process pressure," which is the pressure of the process gas on the top surfaces 310 of the projections 304. This pressure is exerted as the process gas enters the first chamber (process gas chamber) 314 and flows through the flow port 307 into the rotor 116. The pressure of the process gas varies significantly at different stages of the PSA cycle, so the process pressure indicated by arrows 326 also varies. Arrows 328 (one numbered in FIG. 21A) indicate the "activation pressure," which is the pressure of the gas in the second chamber (activation gas chamber) 316 against the ledges 312. Arrows 330 (one upward and one downward numbered in FIG. 21A) indicate the "opening pressure," which is the pressure against the sealing face 309 and upper rotor end plate 172 that is exerted by leakage of the process gas. In the illustrated example, the opening pressure diminishes with further distance from the flow port 307, as indicated by the relative lengths of the arrows 330.

Directly adjacent to the flow port 307, the opening pressure is substantially equal to the process pressure. At the far edge of the sealing face 309, the opening pressure is substantially equal to the ambient pressure ($P_0$), such as the pressure inside the rotor housing 119. The opening pressure across the sealing face 309 from the flow port 307 to the far edge can decrease according to a variety of profiles. In some implementations, the profile is linear, as shown by line 332 in FIG. 21A. The profile also can be convex or concave, as shown by lines 334 and 336, respectively. In the embodiment of FIGS. 1-19, the profile matches the convex line 334. The total opening pressure across the sealing face 309 from the flow port 307 to the far edge can be calculated using modeling. Appropriate models are disclosed, for example, in Alan O. Lebeck, *Principles and Design of Mechanical Face Seals*, John Wiley & Sons, Inc. (1991), which is incorporated herein by reference. In some implementations, the opening pressure ($P_{Opening}$) at any radius (R) along the width of the sealing face 309 is expressed by equation (1) below:

$$P_{Opening} = \sqrt{\frac{(P_I^2 - P_0^2) \cdot (R_0 - R)}{(R_0 - R_I)} + P_0^2} \quad (1)$$

In equation (1), $P_I$ is the pressure adjacent to the flow port 307, $P_0$ is the pressure at the far edge of the sealing face 309, $R_I$ is the radius adjacent to the flow port 307, and $R_0$ is the radius at the far edge of the sealing face. The total opening pressure also can be determined empirically, such as by measuring the pressure through pressure ports (not shown) along the width of the sealing face 309.

The process pressure ($P_{Process}$) and the activation pressure ($P_{Activation}$) both increase the net closing force ($F_{NetClose}$), because they force the sealing face 309 downward. In contrast, the opening pressure ($P_{Opening}$) reduces the net closing force because it forces the sealing face 309 upward. The net closing force can be calculated using the following equations:

$$F_{NetClose} = F_{Close} - F_{Open} \quad (2)$$

$$F_{NetClose} = P_{Process} \cdot A_{Process} + P_{Activation} \cdot A_{Activation} - \int_{P_{Process}}^{P_0} P_{Opening} \, dA_{Opening} \quad (3)$$

In equation (3), $A_{Process}$ is the area of the top surfaces 310 of the projections 304, $A_{Activation}$ is the area of the ledges 312, $A_{Opening}$ is the area of the sealing face 309 (which typically is equal to $A_{Process} + A_{Activation}$), and $P_0$ is the pressure inside the rotor housing 119.

A target net closing force can be calculated considering the competing factors of reducing seal wear, reducing torque, and reducing process gas leakage. For example, in some embodiments, the target net closing force is calculated locally (i.e. for each projection 304) according to the following formula:

$$F_{NetClose} = 0.1 \cdot P_{Process} \cdot (A_{Process} + A_{Activation}) \quad (4)$$

In equation (4), the net closing pressure across the width of the sealing face 309 is set at 10% of the process pressure. The net closing force is equal to the net closing pressure multiplied by the area of the sealing face (which is equal to $A_{Process} + A_{Activation}$). Since the process pressure typically varies around the circumference of the upper seal assembly 179, if calculated locally, the net closing force also varies. In areas of high process pressure, the net closing force will be greater than in areas of low process pressure.

FIG. 21A shows the upper rotor end plate 172 and arrows 338 (one upward and one downward numbered in FIG. 21A) represent the net closing pressure according to equation (4) against the sealing face 309 and against upper rotor end plate 172. The gap between the upper rotor end plate 172 and the sealing face 309 is exaggerated to make room for the opening pressure arrows 330 and the net closing pressure arrows 338.

The variables that can be adjusted to achieve the target net closing force include the activation pressure and the ratio of the process area to the activation area. Typically, the activation pressure is set to be the same around the entire circumference of the upper seal assembly 179. The process pressure, however, typically changes at different positions around the circumference of the upper seal assembly 179. To achieve the target net closing force locally, the ratio of the process area to the activation area can be varied. In the upper seal assembly 179 shown in FIGS. 18 and 19, each projection 304 represents a separate position about the assembly in which the ratio of the process area to the activation area can be varied to achieve the target net closing force. As discussed above, the first chamber 314 above each projection 304 is sealed from the first chambers 314 above adjacent projections. As shown in FIG. 19, the dimensions and surface areas of the projections 304 vary considerably. Alternatively, in some embodiments, only the average net closing force is considered. That is, the target net closing force can be set to be constant around the circumference of the upper seal assembly 179 (i.e. the same for each projection 304 and not varying with $P_{Process}$).

In these embodiments, the areas of the surfaces of the sealing faces 309 can remain constant around the circumference of the upper seal assembly 179 and equal the sum of $A_{Process}$ (the area of the top surfaces 310) and $A_{Activation}$ (the area of the ledges 312). However, as illustrated in FIGS. 20A and B, these areas can be used as a variable to control contact pressure and to optimize for torque and wear. Certain embodiments (e.g. FIG. 20B) therefore may have the area of the sealing faces 309 be less than the sum of $A_{Process}$ and $A_{Activation}$ (i.e. where width of the wear portion 308 is less than the base 306 in FIG. 21A). In yet other less preferred embodiments, the area of the sealing faces 309 may be greater than the sum of $A_{Process}$ and $A_{Activation}$ (i.e. where width of the wear portion 308 is greater than the base 306 in FIG. 21A). And further still, the areas of the sealing faces may vary around the circumference of the seal assembly.

A variety of materials can be used in embodiments of the disclosed upper sealing assembly 179. Material properties such as coefficient of thermal expansion, stiffness (modulus and thickness), and thermal conductivity are useful to consider. Overall stiffness of the lower portion 302 typically promotes stable operation over time. Some compliance, however, is desirable to accommodate imperfections in the flatness of the upper rotor end plate 172. In some embodiments, the lower portion 302 is stiffer in the areas around the flow ports 307 and less stiff further from the flow ports. For example, the lower portion 302 above the wear portion 308 can be honeycombed with thicker cross members around the flow ports 307 and thinner cross members in areas further from the flow ports. In some embodiments, the wear portion 308 is made of a polymeric material or materials, such as filled polytetrafluoroethylene, and the remainder of the lower portion 302 is made of a metal, metal alloy, or combinations thereof, such as carbon steel. The wear portion 308 can be coupled to the remainder of the lower portion 302 by any suitable means, such as by using epoxy. The upper portion 300 and other surrounding structures can be made of suitable materials, such as metals or metal alloys. For example, the upper portion 300 can be made of carbon steel and the other surrounding portions (e.g., the upper rotor end plate 172) can be made of cast iron.

The seal assembly described above differs from prior art designs particularly in that gas pressure that is not derived from the process gases, is also used to provide balancing pressures for the seal assembly. Prior art designs instead used mechanical devices such as springs. Note that in both the present invention and in prior art designs, process gases are employed to provide variable balancing pressures around the seal assembly. However, additional fixed balancing pressures are also typically provided in order to ensure closing forces are adequate at all times and at all locations around the seal assembly. In prior art designs, these fixed pressures were provided by springs. In the instant invention, these fixed pressures are provided by gases other than the process gases.

Figure 21B:
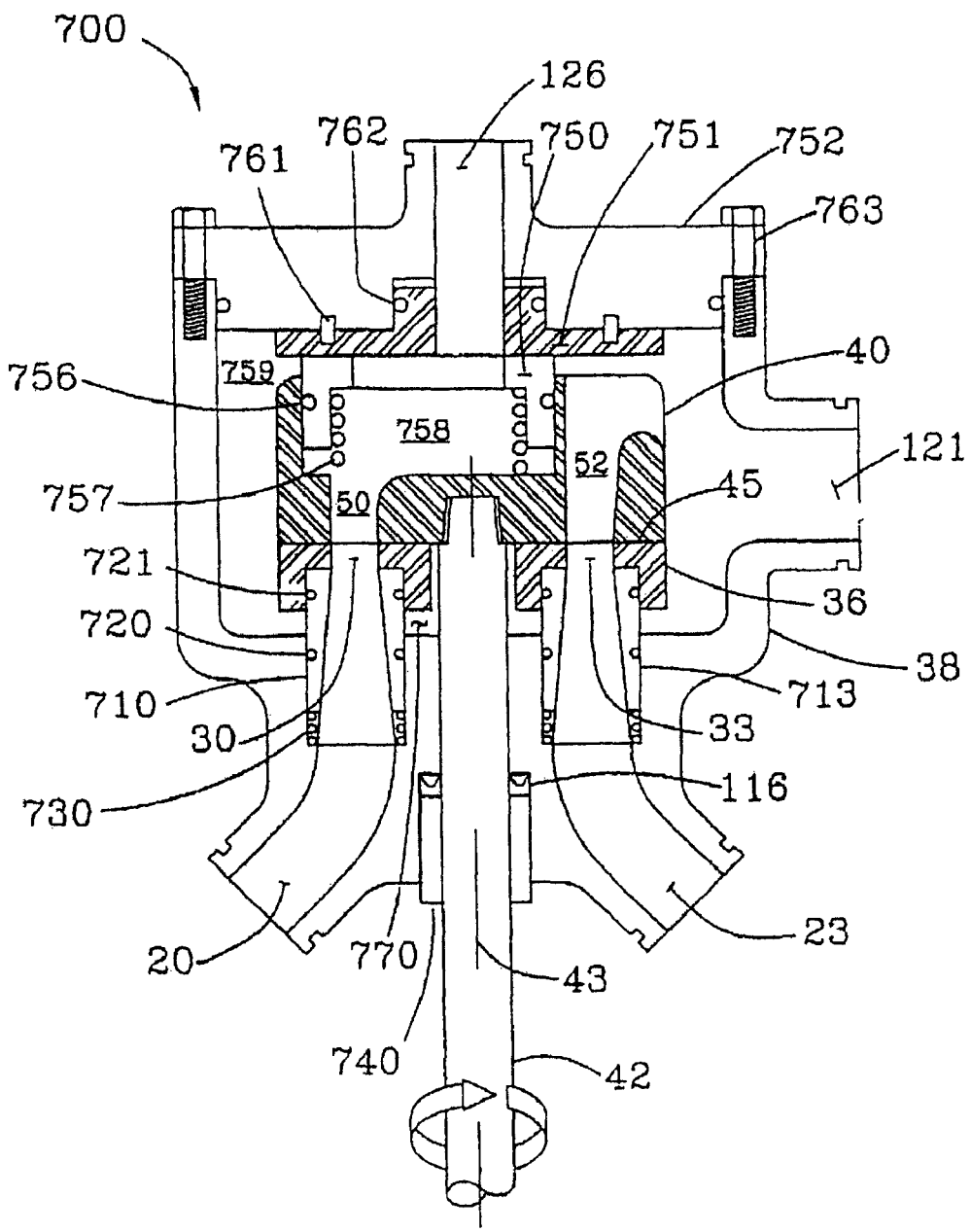
FIG. 21B compares a schematic cross-sectional view of a prior art seal assembly reproduced from U.S. RE38493.

This is exemplified in FIG. 21B which has been reproduced from U.S. RE38493, and shows a prior art rotary distributor valve design in which mechanical springs are employed to provide fixed balancing pressure. (Note that in FIG. 21B, the original reference numerals presented in U.S. RE38493 have been retained. Thus, solely in this FIG. 21B, the reference numerals do not match those in the rest of this disclosure.) In FIG. 21B, stator 36 and fluid transfer sleeves 710 serve similar pressure balanced valve functions as does seal assembly 179 in the instant disclosure. In both embodiments, process gas is employed to provide a variable balancing pressure against rotor 40 (in FIG. 21B) and upper rotor end plate 172 (In FIG. 21A). However, externally supplied activation gas is employed in FIG. 21A to apply an additional balancing pressure to ledges 312 in seal assembly 179 while mechanical compression springs 730 are employed in the prior art embodiment of FIG. 21B.

The pressure applied by springs 730 in FIG. 21B or by activation pressure 328 in FIG. 21A is generally fixed for a given process application. In the former however, the pressure exerted by the springs will slowly change with wear of the seal ((e.g. with wear of wear portion 308/sealing face 309). An advantage of the latter is that the pressure applied by the activation gas will stay constant as the seal wears.

And, although the pressure applied by springs 730 in FIG. 21B or by activation pressure 328 in FIG. 21A is generally fixed for a given process application, the latter allows for this applied pressure to nonetheless be varied, if desired, by varying the pressure of externally supplied activation gas. In the former however, the PSA device would have to be disassembled and springs 730 replaced in order to change this applied pressure. Thus, the present seal assembly allows for greater flexibility should the application conditions change (e.g. if the feed gas were supplied at different pressures or had different composition and different pressures were then desired during the various PSA stages).

Exemplary Process Specifications

PSA processes can involve subjecting an adsorber element to a series of stages within a cycle. As discussed above, each complete rotation of the rotor in a rotary pressure swing device can transition each adsorber element through the stages of one or more than one complete PSA cycle. The stages included in a cycle can vary significantly depending on the process objectives. Furthermore, the order of the stages and the duration of the stages also can be modified. Embodiments of the disclosed rotary pressure swing device are compatible with a variety of cycles. For purposes of illustration, one such cycle compatible with the embodiment illustrated in FIGS. 1-15 is described below. When used for hydrogen purification with the pressure swing device 100 of FIGS. 1-15, the cycle described below can be used to produce a product that is about 90% pure.

Figure 22:
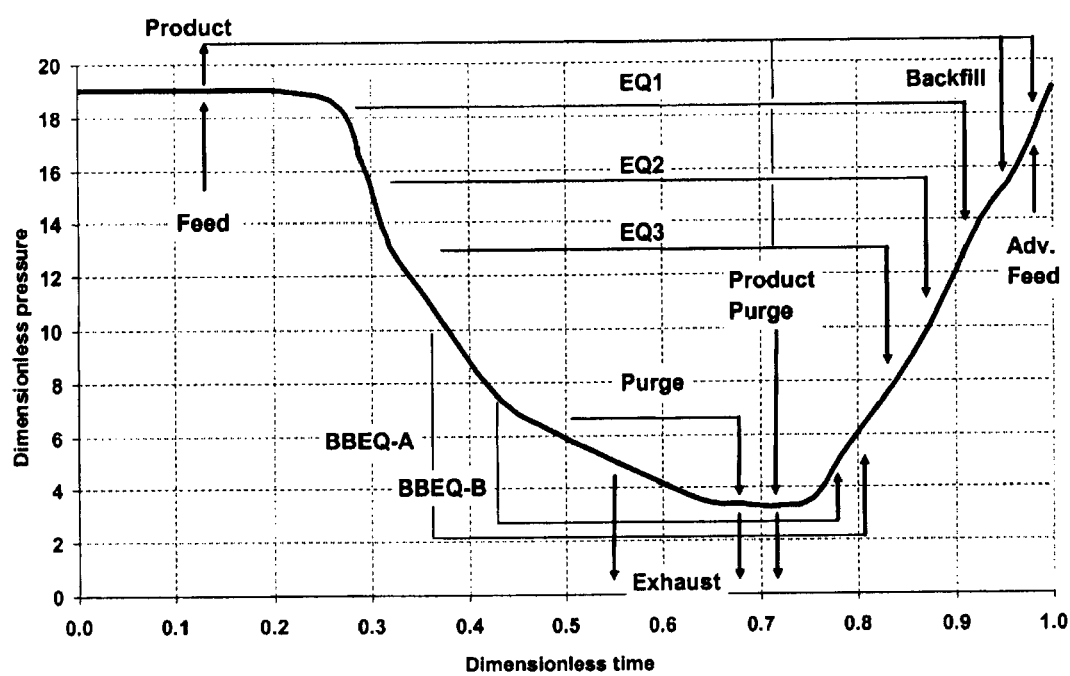
FIG. 22 is a plot of dimensionless pressure versus dimensionless time for an adsorber element subjected to a process cycle compatible with some embodiments of the disclosed rotary pressure swing device.

FIG. 22 is a plot of dimensionless pressure versus dimensionless time for an adsorber element subjected to the exemplary cycle described herein. The order of the stages is listed in Table 1.

TABLE 1

Stages in PSA Cycle

| Order | Stage |
|---|---|
| 1 | Production |
| 2 | Supply Equalization 1 |
| 3 | Supply Equalization 2 |
| 4 | Supply Equalization 3 |
| 5 | Bottom Supply Equalization A |
| 6 | Bottom Supply Equalization B |
| 7 | Supply Purge |
| 8 | Evacuation |
| 9 | Purge |
| 10 | Product Purge |
| 11 | Bottom Equalization B |
| 12 | Bottom Equalization A |
| 13 | Equalization 3 |
| 14 | Equalization 2 |
| 15 | Equalization 1 |
| 16 | Backfill |
| 17 | Pressurize/Backfill |

Production involves flowing feed gas through the adsorber element to produce product gas. This stage is performed at high pressure. Equalization stages are included to conserve some of the pressurization energy. Each equalization stage involves opening a path between two adsorber elements so that high pressure gas in one of the adsorber elements can flow into the other adsorber element. This partially depressurizes the higher pressure adsorber element subsequent to production and partially pressurizes the lower pressure adsorber element prior to production. After equalization, the adsorber element is purged and then evacuated into the atmosphere. After evacuation, the adsorber element is purged with product gas and then again subjected to equalization. Backfill and pressurization stages are then performed to bring the adsorber element to the production pressure.

In view of the many possible embodiments to which the principles of the disclosed invention may be applied, it should be recognized that the illustrated embodiments are only preferred examples of the invention and should not be taken as limiting the scope of the invention.

We claim:

1. A seal assembly for use in a rotary valve in a rotary gas separation device, the assembly comprising a seal backer and a mating floating seal that is movable with respect to the seal backer, the seal backer comprising a plurality of apertures aligned with flow ports through the floating seal, the floating seal comprising a sealing face opposite the seal backer to provide sealing engagement to an adjacent surface rotating with respect to the seal assembly, the seal backer and the mated floating seal defining fluidly isolated process gas chambers and activation gas chambers for receiving process and activation gases respectively for applying sealing pressure to the floating seal, wherein each process gas chamber is fluidly connected to a flow port through the floating seal, and each activation gas chamber is fluidly connectable to a source of activation gas.

2. The assembly of claim 1 wherein the seal backer comprises at least one stepped bore for receiving a mating, stepped portion of the floating seal.

3. The assembly of claim 1 wherein the process gas chambers and activation gas chambers are defined by the surfaces of the stepped bore and the stepped portion of the floating seal.

4. The assembly of claim 1 wherein each activation gas chamber is fluidly connectable to an external supply of activation gas.

5. The assembly of claim 4 wherein the activation gas chambers are all fluidly interconnected.

6. The assembly of claim 5 further comprising a pressurization port opening in the seal backer that is fluidly connected to the activation gas receiving chambers.

7. The assembly of claim 3 wherein the floating seal is circular and the stepped portion is divided into projections spaced about its circumference with spaces between the projections.

8. The assembly of claim 7 additionally comprising seals positioned between the seal backer and the floating seal to fluidly isolate the process gas and activation gas chambers.

9. The assembly of claim 7 wherein at least some of the projections have different shapes and dimensions.

10. The assembly of claim 9 wherein the stepped bore in the seal backer comprises plural bores for receiving the projections in the stepped portion of the floating seal.

11. The assembly of claim 9 wherein each projection has a process gas chamber surface and an activation gas chamber surface opposite the sealing face of the floating seal.

12. The assembly of claim 11 wherein the sum of the process gas and activation gas chamber surface areas in a projection is equal to the area of the opposing sealing surface.

13. The assembly of claim 11 wherein the ratio of the process gas chamber surface area to the activation gas chamber surface area varies between two or more projections.

14. A rotary gas separation device comprising a rotary valve comprising the seal assembly of claim 1.

15. A rotary pressure swing adsorption device comprising a rotary valve comprising the seal assembly of claim 1.

16. A method for providing a seal in a rotary valve in a rotary gas separation device, comprising:
providing a rotary gas separation device comprising a stator, a rotor, and a rotary valve comprising the seal assembly of claim 1;
cyclically flowing pressurized process gas into the process gas chambers; and
flowing activation gas into the activation gas chambers at a pressure suitable to establish a pressure balanced seal between the seal assembly and the rotor.

17. The method of claim 16 wherein the gas separation device is a pressure swing adsorption device.

18. A method for providing a seal in a rotary valve in a rotary gas separation device, comprising:
providing a rotary gas separation device comprising a stator, a rotor, and a rotary valve comprising the seal assembly of claim 11;
selecting a process gas chamber surface area and an activation gas surface area for each projection in accordance with the process gas pressures employed in the gas separation device;
cyclically flowing pressurized process gas into the process gas chambers; and
flowing activation gas into the activation gas chambers at a pressure suitable to establish a pressure balanced seal between the seal assembly and the rotor.

19. The method of claim 18 wherein a local net closing pressure is established across the width of the sealing face that is about 10% of the local process gas pressure.

20. The method of claim 18 wherein the activation gas is provided from an external source.

21. The method of claim 18 wherein all the activation gas chambers receive activation gas at the same pressure.

* * * * *